(12) United States Patent
Kataoka et al.

(10) Patent No.: US 7,964,655 B2
(45) Date of Patent: Jun. 21, 2011

(54) LIQUID COMPOSITION

(75) Inventors: Shuichi Kataoka, Nagano-Ken (JP);
Kiyohiko Takemoto, Nagano-Ken (JP);
Mitsumasa Hashimoto, Fukushima-Ken (JP); Minoru Takeuchi, Tokyo-To (JP)

(73) Assignee: Seiko Epson Corporation, Tokyo (JP)

( * ) Notice: Subject to any disclaimer, the term of this patent is extended or adjusted under 35 U.S.C. 154(b) by 706 days.

(21) Appl. No.: 10/545,732

(22) PCT Filed: Feb. 17, 2004

(86) PCT No.: PCT/JP2004/001698
§ 371 (c)(1),
(2), (4) Date: Jul. 16, 2006

(87) PCT Pub. No.: WO2004/071782
PCT Pub. Date: Aug. 26, 2004

(65) Prior Publication Data
US 2006/0264533 A1 Nov. 23, 2006

(30) Foreign Application Priority Data

Feb. 17, 2003 (JP) .................. 2003-038880
Feb. 17, 2003 (JP) .................. 2003-038895
Feb. 17, 2003 (JP) .................. 2003-038898
Apr. 1, 2003 (JP) .................. 2003-098628
Jul. 31, 2003 (JP) .................. 2003-204550

(51) Int. Cl.
*C09D 11/00* (2006.01)
*C08G 67/02* (2006.01)
*C08G 18/42* (2006.01)
*B05D 7/00* (2006.01)
*B22F 1/00* (2006.01)

(52) U.S. Cl. ........ 523/160; 523/161; 524/500; 524/522; 524/612; 347/1

(58) Field of Classification Search .......... 532/160, 532/161; 347/98, 96, 1; 524/555, 612, 500, 524/522

See application file for complete search history.

(56) References Cited

U.S. PATENT DOCUMENTS

| 5,608,432 | A  | * | 3/1997  | Yamaguchi ........... 347/33 |
| 6,439,708 | B1 | * | 8/2002  | Kato et al. ........... 347/98 |
| 6,794,427 | B2 |   | 9/2004  | Kurabayashi et al. |
| 2002/0147251 | A1 | * | 10/2002 | Ohta et al. ........... 523/161 |
| 2002/0198287 | A1 | * | 12/2002 | Ohta et al. ........... 523/160 |
| 2003/0189626 | A1 | * | 10/2003 | Kataoka et al. ........... 347/98 |

FOREIGN PATENT DOCUMENTS

| CN | 2097762 | | 3/1992 |
| CN | 1127770 | | 7/1996 |
| EP | 0 697 445 | | 2/1996 |
| EP | 0892024 | * | 7/1996 |
| EP | 0 892 024 | | 1/1999 |
| EP | 0 892 024 A1 | | 1/1999 |
| EP | 0791605 | * | 2/1999 |
| EP | 1148104 | * | 4/2001 |
| EP | 1 106 658 | | 6/2001 |
| JP | 8-20161 | | 1/1996 |
| JP | 8-20720 | | 1/1996 |
| JP | 8-81611 | | 3/1996 |
| JP | 8-174997 | | 7/1996 |
| JP | 8-282086 | | 10/1996 |
| JP | 9-207424 | | 8/1997 |
| JP | 9-286940 | | 11/1997 |
| JP | 10-95107 | | 4/1998 |
| JP | 2000-34432 | | 2/2000 |
| JP | 2000-263921 | | 9/2000 |
| JP | 2001-315425 | | 11/2001 |
| JP | 2002-137376 | | 5/2002 |
| JP | 2002-302627 | | 10/2002 |
| JP | 2002-337442 | | 11/2002 |

OTHER PUBLICATIONS

JPO computer English translation of JP 2002-337442 dated Nov. 27, 2002.
JPO computer English translation of JP 2002-137376 dated May 14, 2002.
English translation of CN 2097763 dated Mar. 4, 1992.
Computer-Generated English Translation of Specification and Claims and Patent Abstracts of Japan of JP 9-286940 dated Nov. 4, 1997.
Computer-Generated English Translation of Specification and Claims and Patent Abstracts of Japan of JP 9-207424 dated Aug. 12, 1997.

(Continued)

*Primary Examiner* — Basia Ridley
*Assistant Examiner* — Alexander C Kollias
(74) *Attorney, Agent, or Firm* — Ladas & Parry LLP

(57) ABSTRACT

Disclosed is a liquid composition that, while maintaining good color developing properties and gloss, can realize good cleaning operation without staying of the liquid composition in a cleaning cap. The liquid composition is adapted for use with an ink composition for deposition on a recording medium and comprises a modified polyallylamine, a water soluble organic solvent, and water and is free from any colorant. The liquid composition and an ink composition each are deposited onto a recording medium to perform recording. A polymer comprising a recurring unit represented by formula (I) is used as the modified polyallylamine.

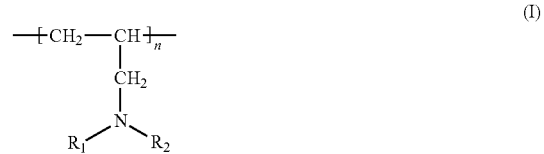

(I)

15 Claims, 4 Drawing Sheets

OTHER PUBLICATIONS

Computer-Generated English Translation of Specification and Claims and Patent Abstracts of Japan of JP 8-81611 dated Mar. 26, 1996.
Patent Abstracts of Japan of JP 8-174997 dated Jul. 9, 1996.
Patents Abstracts of Japan of JP 8-20720 dated Jan. 23, 1996.
Patent Abstracts of Japan of JP 2000-263921 dated Sep. 26, 2000.
Patent Abstracts of Japan of JP 2001-315425 dated Nov. 13, 2001.
Patent Abstracts of Japan of JP 10-95107 dated Apr. 14, 1998.
Patent Abstracts of Japan of JP 2002-302627 dated Oct. 18, 2002.
Patent Abstracts of Japan of JP 2000-34432 dated Feb. 2, 2000.
Patent Abstracts of Japan of JP 8-282086 dated Oct. 29, 1996.
Patent Abstracts of Japan of JP 8-20161 dated Jan. 23, 1996.
Search Report of EPO Application 11000446.2 Issued Mar. 1, 2011.
English Abstract of Japanese Application 8-20720 Filed Jan. W23, 1996.
English Abstract of Japanese Application 2000-263921 Filed Sep. 26, 2000.

* cited by examiner

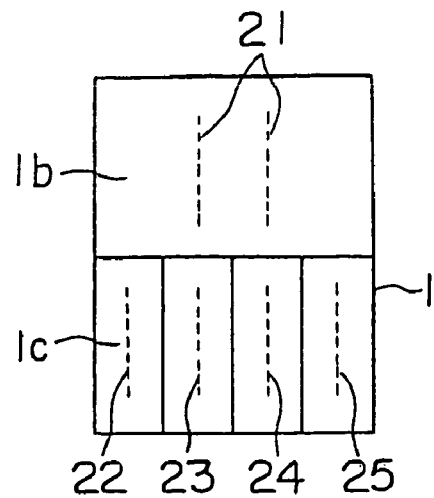
F I G. 2
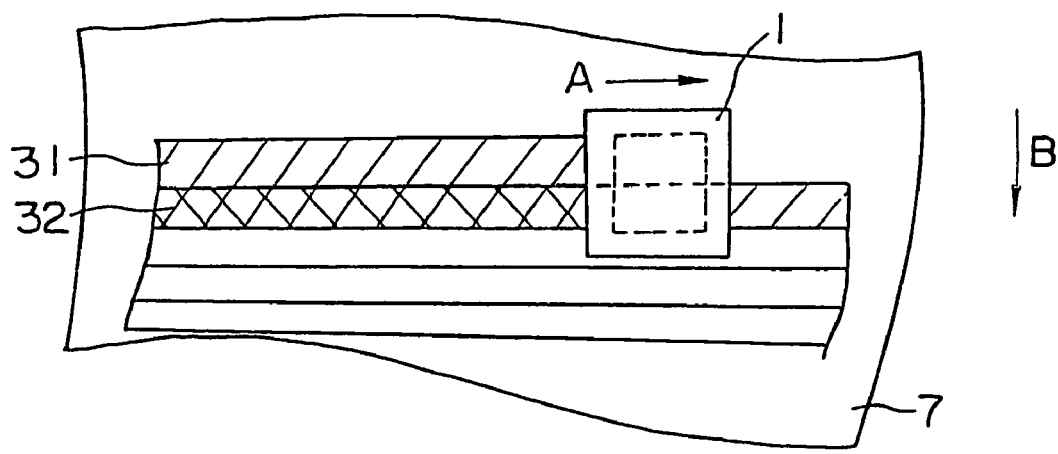
F I G. 3
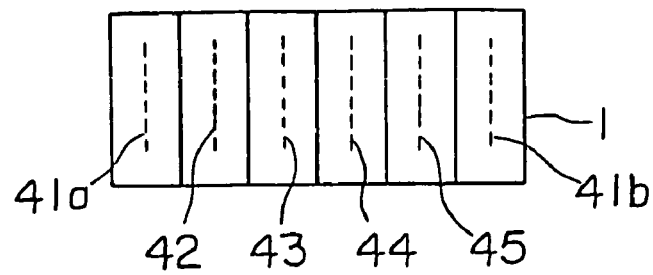
F I G. 4

LIQUID COMPOSITION

TECHNICAL FIELD

The present invention relates to a colorant-free liquid composition for use with a colorant-containing ink composition.

BACKGROUND ART

Ink jet recording is a printing method wherein droplets of an ink composition are ejected and deposited on recording media, such as paper, to perform printing. The feature of the ink jet recording method is that images having a combination of high resolution with high sharpness can be printed at a high speed by means of a relatively inexpensive apparatus. Various ink compositions for use in recording by this ink jet recording method have hitherto been proposed. In recent years, there is an increasing demand for higher-grade recorded images. Among others, various proposals have been made for further improving the color development and gloss of recorded images.

In order to realize high-quality images, a method has been proposed in which an ink composition and a second composition are deposited onto a recording medium to perform printing. For example, Japanese Patent Laid-Open Nos. 207424/1997 and 286940/1997 disclose an ink jet recording method in which an ink composition having a specific composition and a polyallylamine-containing reaction solution are deposited in combination onto a recording medium. Further, Japanese Patent Laid-Open No. 81611/1996 discloses an ink jet recording method in which a cationic material-containing liquid composition and an ink composition are printed in combination.

SUMMARY OF THE INVENTION

The present inventors have now found a liquid composition having a specific formulation which, when deposited in combination with an ink composition on a recording medium, exhibits excellent properties. Among others, the present inventors have found a liquid composition which can realize a high level of storage stability of recorded matter and can realize good cleaning operation without residence of the liquid composition or the ink composition or a mixed liquid composed of the liquid composition and the ink composition (hereinafter often referred to as "waste liquid") in a cleaning cap while maintaining good color development and gloss.

Accordingly, an object of the present invention is to provide a liquid composition having good properties, especially a liquid composition which can realize a high level of storage stability of recorded matter and can realize good cleaning operation without residence of the liquid composition or the ink composition or a waste liquid in a cleaning cap while maintaining good color development and gloss.

The liquid composition according to the present invention is adapted for use with an ink composition for deposition on a recording medium and comprises a modified polyallylamine, a water soluble organic solvent, and water and is free from any colorant. The use of the modified polyallylamine-containing liquid composition can realize a high level of storage stability of recorded matter and can realize good cleaning operation without residence of the liquid composition or the ink composition or a waste liquid in a cleaning cap while maintaining good color development and gloss.

BRIEF DESCRIPTION OF THE DRAWINGS

FIG. 2 is a schematic diagram of a recording head in an ink jet recording apparatus;

FIG. 3 is a simulated diagram of a print pattern formed by an ink jet recording apparatus;

FIG. 4 is a schematic diagram showing the construction of nozzles in a recording head;

DETAILED DESCRIPTION OF THE INVENTION

Definition

Figure 1:
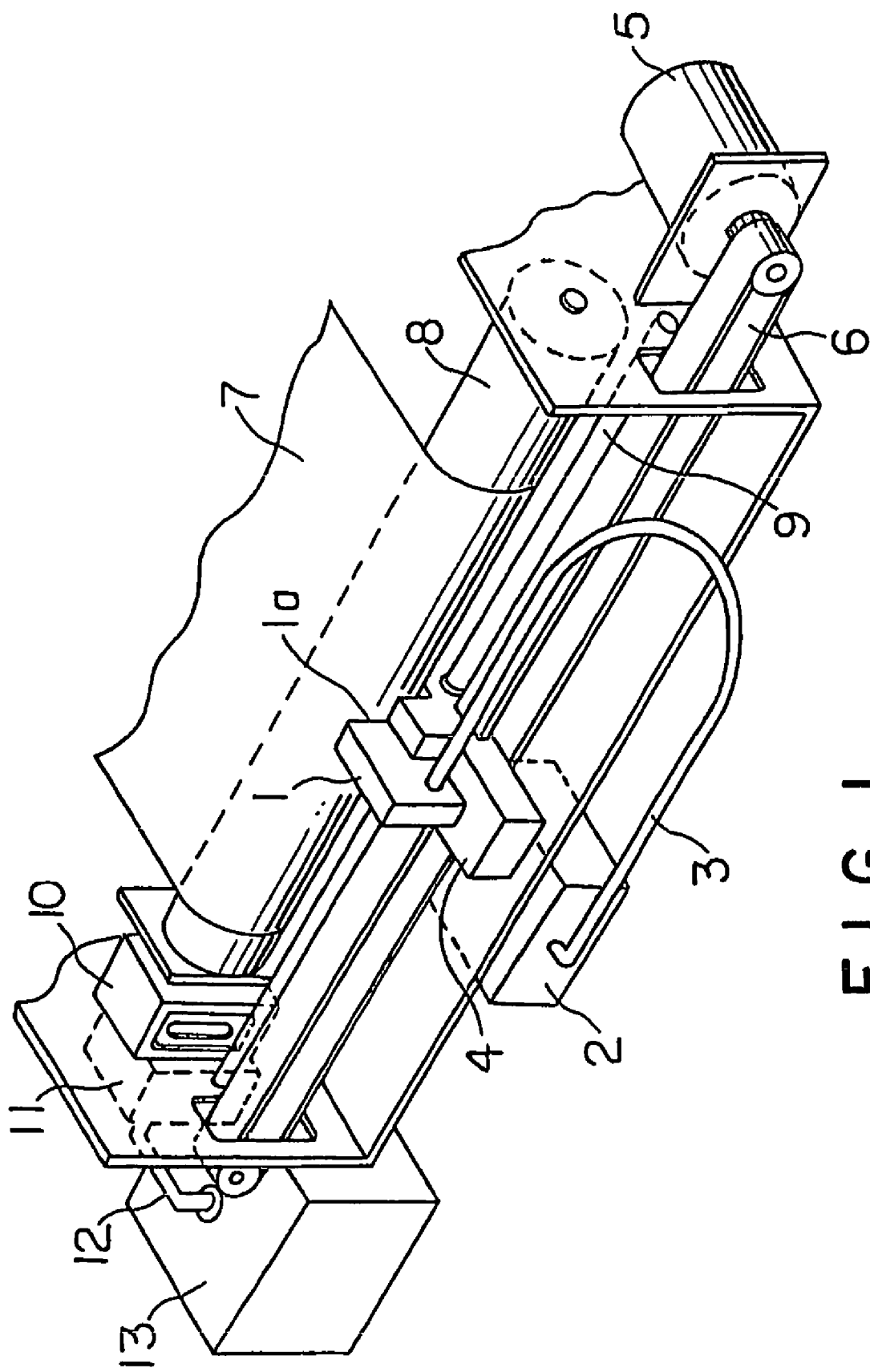
FIG. 1 is a schematic diagram of an ink jet recording apparatus which can realize the recording method according to the present invention.

The term "alkyl group" as used herein as a group or a part of a group may be a straight chain or branched chain alkyl group.

1. Liquid Composition According to First Aspect of Invention

In the liquid composition according to the first aspect of the present invention, the modified polyallylamine is a polymer comprising at least one type of recurring unit represented by formula (I):

(I)

wherein $R^1$ and $R^2$ each independently represent hydrogen atom, an optionally substituted alkyl group, an optionally substituted aryl group, an optionally substituted pyridyl group, an optionally substituted alkylamino group, an optionally substituted hydrazino group, an optionally substituted alkoxy group, or an optionally substituted hydroxyalkyl group.

The liquid composition according to the present invention comprising the above modified polyallyl amine can realize records having excellent storage stability while maintaining good color developing properties and gloss. More specifically, images less susceptible to color change can be realized.

In a preferred embodiment of the present invention, substituents $R^1$ and $R^2$ in formula (I) represent a methyl group, an ethyl group, a propyl group or the like, more preferably a methyl group. Still more preferably, the modified polyallylamine is a dimethyl modification product in which both $R^1$ and $R^2$ represent a methyl group.

The modified polyallylamine is preferably synthesized using an azo initiator from the viewpoint of improving color developing properties.

The weight average molecular weight of the modified polyallylamine is preferably not more than 10,000, more preferably not more than 5,000, still more preferably not more than 2,000. The modification rate of the modified polyallylamine is preferably not less than 50 mol %, more preferably not less than 90 mol %.

The content of the modified polyallylamine may be properly determined from the viewpoints of improving the color developing properties and improving the gloss. In a preferred embodiment of the present invention, the content of the modified polyallylamine in the liquid composition is not less than 0.1% by weight and not more than 30% by weight. More preferably, the lower limit of the modified polyallylamine is 0.1% by weight, still more preferably 0.5% by weight. More preferably, the upper limit is 10% by weight, still more preferably 5% by weight. In the present specification, the content of the modified polyallylamine is on a solid basis.

In the present invention, the modified polyallylamine and polyallylamine or its derivative may be added as a mixture. When they are added as a mixture, the total content of the modified polyallylamine and polyallylamine or its derivative is preferably not less than 0.1% by weight and not more than 30% by weight, based on the total amount of the liquid composition. More preferably, the lower limit of the total content of the modified polyallylamine and polyallylamine or its derivative is 0.1% by weight, still more preferably 0.5% by weight, and the upper limit of the total content of the modified polyallylamine and polyallylamine or its derivative is 10% by weight, still more preferably 5% by weight.

When the modified polyallylamine and polyallylamine or its derivative are added as a mixture, a mixture of a modified polyallylamine having a weight average molecular weight of not more than 2,000 with a modified polyallylamine having a weight average molecular weight of more than 2,000 and not more than 10,000 may be used. The incorporation of the alkyl-modified polyallylamines having different molecular weights and polyallylamine or its derivative is advantageous in that good cleaning operation can be realized while maintaining good color developing properties and gloss without staying of the liquid composition in a cleaning cap.

In a preferred embodiment of the present invention, the liquid composition further contains a modified polyallylamine having a weight average molecular weight of not less than 5,000, and this modified polyallylamine is a polymer comprising at least one type of recurring unit represented by formula (I). When a mixture of two or more types of polyallylamine or its derivative is added, preferably, the mixture comprises polyallylamine or its derivative having a weight average molecular weight of not less than 5,000 and polyallylamine or its derivative having a weight average molecular weight of less than 5,000. The incorporation of such polyallylamines with different molecular weights is advantageous in that good cleaning operation can be realized while maintaining good-color developing properties and gloss without staying of the liquid composition in a cleaning cap.

In a preferred embodiment of the present invention, the liquid composition comprises a high-molecular weight polyallylamine or its derivative having a weight average molecular weight of not less than 5,000 and a low-molecular weight polyallylamine or its derivative having a weight average molecular weight of less than 5,000 in a ratio of 1:0.25 to 1:4, more preferably in a ratio of 1:0.5 to 1:2.

2. Liquid Composition According to Second Aspect of the Invention

The liquid composition according to the second aspect of the present invention preferably comprises polyethyleneimine or its derivative in addition to the modified polyallylamine. The polyethyleneimine or its derivative is a polymer comprising at least one type of recurring unit represented by formula (II):

(II)

wherein $R^1$ represents a hydrogen atom, an optionally substituted alkyl group, an optionally substituted aryl group, an optionally substituted pyridyl group, an optionally substituted alkylamino group, an optionally substituted hydrazino group, an optionally substituted alkoxy group, or an optionally substituted hydroxyalkyl group.

In a preferred embodiment of the present invention, the weight average molecular weight (Mw) of the polyethyleneimine or its derivative is not more than 10,000. More preferably, the lower limit of the weight average molecular weight (Mw) of the polyethyleneimine or its derivative is 100, and the upper limit thereof is 5,000.

Polyethyleneimine may be easily produced by a conventional production process. For example, polyethyleneimine may be produced by subjecting an ethyleneimine having a corresponding structure to ring opening polymerization in the presence of a catalyst such as carbon dioxide, hydrochloric acid, hydrobromic acid, p-toluenesulfonic acid, aluminum chloride, or boron trifluoride, or by a polycondensation reaction of ethylene chloride with an ethylenediamine compound.

In a preferred embodiment of the present invention, examples of polymers comprising at least one type of recurring unit represented by formula (II) include the following compounds.

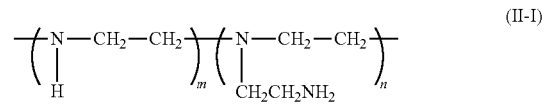
(II-I)

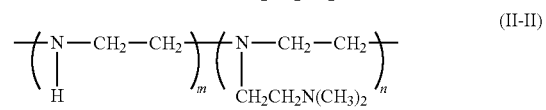
(II-II)

wherein m and n are numerical values that bring the weight average molecular weight (Mw) of polyethyleneimine to not more than 10,000.

In the present invention, the polyethyleneimine and its derivative may be one wherein a part of the side chain or the end has been anionically modified or cationically modified.

In the present invention, the content of the polyethyleneimine or its derivative may be properly determined from the viewpoints of improving the color developing properties and improving the gloss. The content of the polyethyleneimine or its derivative is preferably not less than 0.1% by weight and not more than 30.0% by weight, based on the total amount of the liquid composition. More preferably, the lower limit of the content of the polyethyleneimine or its derivative is 0.2% by weight, still more preferably 0.5% by weight. More preferably, the upper limit is 10.0% by weight, still more preferably 5.0% by weight. In the present specification, the content of the polyethyleneimine or its derivative is on a solid basis.

In the present invention, two or more types of polyethyleneimine or its derivative may be added as a mixture. When a mixture of two or more types of polyethyleneimine or its derivative is added, the total content thereof is preferably not less than 0.1% by weight and not more than 30.0% by weight, based on the total amount of the liquid composition. More preferably, the lower limit of the total content is 0.2% by weight, still more preferably 0.5% by weight, and the upper limit is 10.0% by weight, still more preferably 5.0% by weight.

3. Liquid Composition According to Third Aspect of the Invention

The liquid composition according to the third aspect of the present invention comprises a modified polyallylamine comprising the following recurring units, that is, a modified polyallylamine having, as a basic structure, a copolymer of an N,N-dialkylallylamine with allylamine.

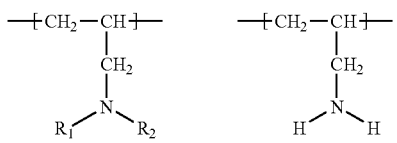

wherein $R_1$ and $R_2$ each independently represent an alkyl group having 1 to 4 carbon atoms.

The modified polyallylamine used in the present invention is one in which one or two hydrogen atoms in —$NH_2$ in the recurring unit of the allylamine have been substituted by any of the following (i) to (v).

Specifically, groups (i) to (v) are (i) —$CONH_2$ (hereinafter referred to as "urea modified polyallylamine"), (ii) —$COOR_3$ (hereinafter referred to as "urethane modified polyallylamine"), (iii) —$COR_4$ (hereinafter referred to as "acyl modified polyallylamine"), (iv) —$CH_2CH(R_5)$-A (hereinafter referred to as "Michael modified polyallylamine"), and (v) —$CH_2CH(OH)$-B (hereinafter referred to as "alcohol modified polyallylamine").

Each of the above modified polyallylamines in the present invention will be described.

(i) Urea Modified Polyallylamine

The urea modified polyallylamine is a copolymer comprising the following recurring units (a) and (c1), or a copolymer comprising the following recurring units (a), (b) and (c1).

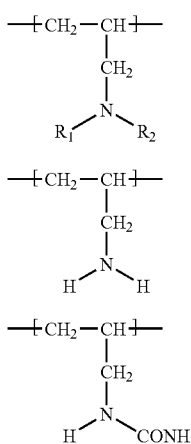

wherein $R_1$ and $R_2$ each independently represent an alkyl group having 1 to 4 carbon atoms.

$R_1$ and $R_2$ preferably represent the same group, and examples thereof include methyl, ethyl, propyl, and butyl groups. Among them, the methyl group is preferred.

The proportion of recurring unit (a) is preferably 5 to 95%, more preferably 10 to 90%, particularly preferably 20 to 80%, based on the total number of monomers constituting the modified polyallylamine. In this case, the degree of carbamoylation, that is, the proportion of recurring unit (c1) based on the total number of recurring units (b) and (c1), is preferably 60 to 100%, more preferably 90 to 100%, particularly preferably 95 to 100%, from the viewpoints of dissolvability and stability of the modified polyallylamine.

(ii) Urethane Modified Polyallylamine

The urethane modified polyallylamine is a copolymer comprising the following recurring units (a) and (c2), or a copolymer comprising the following recurring units (a), (b), and (c2).

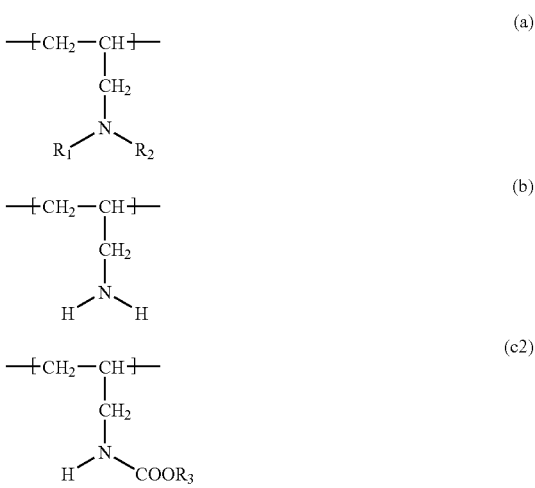

wherein $R_1$ and $R_2$ each independently represent an alkyl group having 1 to 4 carbon atoms, and $R_3$ represents an alkyl or aryl group having 1 to 12 carbon atoms.

$R_1$ and $R_2$ preferably represent the same group, and examples thereof include methyl, ethyl, propyl, and butyl groups. Among them, the methyl group is preferred.

$R_3$ represents an alkyl group or an aryl group having 1 to 12 carbon atoms. When $R_3$ represents an alkyl group having 1 to 12 carbon atoms, straight chain alkyl groups having 1 to 4 carbon atoms, such as methyl, ethyl, propyl, and butyl groups, are preferred. Examples of the aryl group having 1 to 12 carbon atoms include phenyl, o-tolyl, m-tolyl, and p-tolyl groups.

The proportion of recurring unit (a) is preferably 5 to 95%, more preferably 10 to 90%, particularly preferably 20 to 80%, based on the total number of monomers constituting the modified polyallylamine. In this case, the degree of alkoxycarbonylation (or allyloxycarbonylation), that is, the proportion of recurring unit (c2) based on the total number of recurring units (b) and (c2), is preferably 60 to 100%, more preferably 90 to 100%, particularly preferably 95 to 100%, from the viewpoints of dissolvability and stability of the modified polyallylamine.

(iii) Acyl Modified Polyallylamine

The acyl modified polyallylamine is a copolymer comprising the following recurring units (a) and (c3), or a copolymer comprising the following recurring units (a), (b), and (c3).

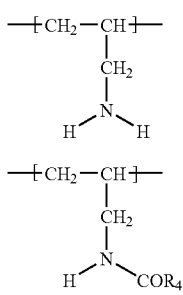

wherein $R_1$ and $R_2$ each independently represent an alkyl group having 1 to 4 carbon atoms, and $R_4$ represents an alkyl group having 1 to 12 carbon atoms.

$R_1$ and $R_2$ preferably represent the same group, and examples thereof include methyl, ethyl, propyl, and butyl groups. Among them, the methyl group is preferred.

$R_4$ represents an alkyl group having 1 to 12 carbon atoms. Preferred examples thereof include methyl, ethyl, n-propyl, i-propyl, n-butyl, n-pentyl, n-hexyl, n-heptyl, and n-nonyl groups.

The proportion of recurring unit (a) is preferably 5 to 95%, more preferably 10 to 90%, particularly preferably 20 to 80%, based on the total number of monomers constituting the modified polyallylamine. In this case, the degree of acylation, that is the proportion of recurring unit (c3) based on the total number of recurring units (b) and (c3), is preferably 60 to 100%, more preferably 90 to 100%, particularly preferably 95 to 100%, from the viewpoints of dissolvability and stability of the modified polyallylamine.

(iv) Michael Modified Polyallylamine

The Michael modified polyallylamine is a copolymer comprising the following recurring units (a), (c41), and/or (c42), or a copolymer comprising the following recurring units (a), (b), (c41), and/or (c42).

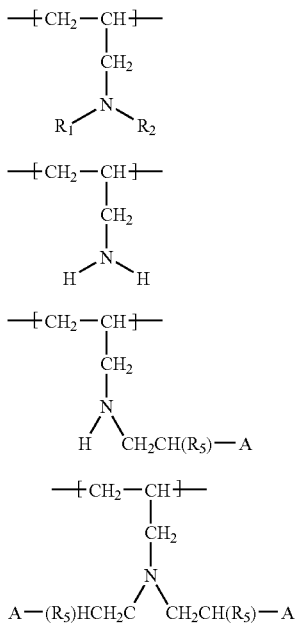

wherein $R_1$ and $R_2$ each independently represent an alkyl group having 1 to 4 carbon atoms, $R_5$ represents hydrogen atom or a methyl group, and A is selected from the group consisting of —$CONR_6R_7$ wherein $R_6$ and $R_7$ each independently represent a hydrogen atom or an alkyl group having 1 to 8 carbon atoms and the alkyl group is optionally substituted by a group selected from the group consisting of a hydroxyl group, a keto group, a monoalkylamino group having 1 to 4 carbon atoms, a di(alkyl with 1 to 4 carbon atoms)amino group, or a tri(alkyl with 1 to 4 carbon atoms)ammonium group, or $NR_6R_7$ combine together to represent a cyclic amino group of a piperidino or morpholino group; —CN; and $COOR_8$ wherein $R_8$ represents an alkyl group having 1 to 8 carbon atoms and the alkyl group is optionally substituted by a group selected from the group consisting of a hydroxyl group, a keto group, a monoalkylamino group having 1 to 4 carbon atoms, a di(alkyl with 1 to 4 carbon atoms)amino group, and a tri(alkyl with 1 to 4 carbon atoms)ammonium group.

$R_1$ and $R_2$ preferably represent the same group, and a methyl group is preferred.

Group —$CH_2CH_2(R_5)$-A is generally a Michael reaction adduct of an acrylic compound. When group —$CH_2CH_2(R_5)$-A is of acrylamide adduct type wherein A is of —$CONR_6R_7$ type, examples thereof include —$CH_2CH_2CONH_2$, —$CH_2CH_2CONHCH_3$, —$CH_2CH_2CON(CH_3)_2$, —$CH_2CH_2CONHC_2H_5$, —$CH_2CH_2CON(C_2H_5)_2$, —$CH_2CH_2CONH$-$nC_3H_7$, —$CH_2CH_2CON(nC_3H_7)_2$, —$CH_2CH_2CONH$-$iC_3H_7$, —$CH_2CH_2CONHCH_2O$-$nC_4H_9$, —$CH_2CH_2CONHCH_2OH$, —$CH_2CH_2CONHCH_2CH_2N(CH_3)_2$, —$CH_2CH_2CONHCH_2CH_2N(C_2H_5)_2$, —$CH_2CH_2CONHCH_2CH_2CH_2N(CH_3)_2$, —$CH_2CH_2CONHCH_2CH_2CH_2N(C_2H_5)_2$, —$CH_2CH_2CONHCH_2CH_2N^+(CH_3)_3$, —$CH_2CH_2CONHCH_2CH_2N^+(C_2H_5)_3$, —$CH_2CH_2CONHCH_2CH_2CH_2N^+(CH_3)_3$, —$CH_2CH_2CONHCH_2CH_2CH_2N^+(C_2H_5)_3$, —$CH_2CH_2CO$-morpholino group, —$CH_2CH_2CO$-piperidino group, —$CH_2CH(CH_3)CONH_2$, —$CH_2CH(CH_3)CONHCH_3$, —$CH_2CH(CH_3)CON(CH_3)_2$, —$CH_2CH(CH_3)CONHC_2H_5$, —$CH_2CH(CH_3)CON(C_2H_5)_2$, —$CH_2CH(CH_3)CONH$-$nC_3H_7$, —$CH_2CH(CH_3)CON(nC_3H_7)_2$, —$CH_2CH(CH_3)CONH$-$iC_3H_7$, —$CH_2CH(CH_3)CONHCH_2O$-$nC_4H_9$, —$CH_2CH(CH_3)CONHCH_2OH$, —$CH_2CH(CH_3)CONHCH_2CH_2N(CH_3)_2$, —$CH_2CH(CH_3)CONHCH_2CH(CH_3)N(C_2H_5)_2$, —$CH_2CH(CH_3)CONHCH_2CH_2N(CH_3)_2$, —$CH_2CH(CH_3)CONHCH_2CH_2N(C_2H_5)_2$, —$CH_2CH(CH_3)CONHCH_2CH_2N^+(CH_3)_3$, —$CH_2CH(CH_3)CONHCH_2CH_2N^+(C_2H_5)_3$, —$CH_2CH(CH_3)CONHCH_2CH_2CH_2N^+(CH_3)_3$, —$CH_2CH(CH_3)CONHCH_2CH_2CH_2N^+(C_2H_5)_3$, —$CH_2CH(CH_3)CO$-morpholino group, and —$CH_2CH(CH_3)CO$-piperidino group.

When group —$CH_2CH_2(R_5)$-A is of acrylonitrile adduct type, examples thereof include —$CH_2CH_2CN$, and —$CH_2CH(CH_3)CN$.

Further, when group —$CH_2CH_2(R_5)$-A is of acrylic ester adduct type, examples thereof include —$CH_2CH_2COOCH_3$, —$CH_2CH_2COOC_2H_5$, —$CH_2CH_2COOC_3H_7$, —$CH_2CH_2COOC_4H_9$, —$CH_2CH_2COOCH_2CH_2N(CH_3)_2$, —$CH_2CH_2COOCH_2CH_2CH_2N(CH_3)_2$, —$CH_2CH_2COOCH_2CH_2N(C_2H_5)_2$, —$CH_2CH_2COOCH_2CH_2CH_2N(C_2H_5)_2$, —$CH_2CH_2COOCH_2CH_2N^+(CH_3)_3$, —$CH_2CH_2COOCH_2CH_2N^+(C_2H_5)_3$, and —$CH_2CH_2COOCH_2CH_2CH_2N^+(C_2H_5)_3$.

The proportion of recurring unit (a) is preferably 5 to 95%, more preferably 10 to 90%, particularly preferably 20 to 80%, based on the total number of monomers constituting the modified polyallylamine. In this case, the degree of Michael adduct type conversion, that is, the proportion of recurring units (c41) and/or (c42) based on the total number of recurring units (b) and (c41) and/or (c42), is preferably 60 to 100%, more preferably 90 to 100%, particularly preferably 95 to 100%, from the viewpoints of dissolvability and stability of the modified polyallylamine.

The proportion of recurring unit (c42) based on the total number of recurring units (c41) and (c42) is preferably 60 to 100%, more preferably 90 to 100%, particularly preferably 95 to 100%, from the viewpoint of wastewater treatment.

(v) Alcohol Modified Polyallylamine

The alcohol modified polyallylamine is a copolymer comprising the following recurring units (a), (c51) and/or (c52), or a copolymer comprising the following recurring units (a), (b), (c51) and/or (c52).

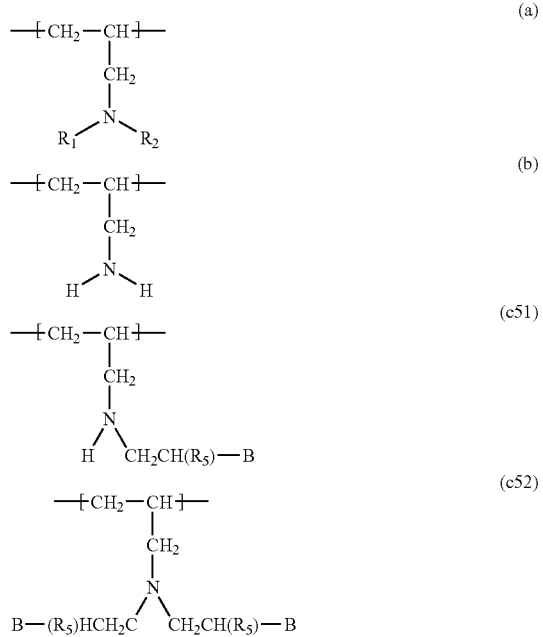

wherein $R_1$ and $R_2$ each independently represent an alkyl group having 1 to 4 carbon atoms; and B represents an alkyl group having 1 to 8 carbon atoms and the alkyl group is optionally substituted by a group selected from the group consisting of a hydroxyl group, an alkoxy group having 1 to 4 carbon atoms, and an alkenyloxy group.

$R_1$ and $R_2$ preferably represent the same group, and a methyl group is preferred.

B represents a hydroxyl group; an alkyloxy group having 1 to 4 carbon atoms; or an alkyl group having 1 to 8 carbon atoms which may contain an alkenyloxy group. Specific examples thereof include methyl, ethyl, propyl, butyl, pentyl, hexyl, methoxymethyl, ethoxymethyl, propyloxymethyl, butoxymethyl, pentoxymethyl, hydroxymethyl, and (2-propenyloxy)methyl groups.

Examples of group —$CH_2CH_2(R_5)$-B include 2-hydroxypropyl, 2-hydroxybutyl, 2-hydroxypentyl, 2-hydroxyhexyl, 2-hydroxyheptyl, 2-hydroxyoctyl, 3-methoxy-2-hydroxypropyl, 3-ethoxy-2-hydroxypropyl, 3-propyloxy-2-hydroxypropyl, 3-(i-propyloxy)-2-hydroxypropyl, 3-butoxy-2-hydroxypropyl, 3-pentoxy-2-hydroxypropyl, 2,3-dihydroxypropyl, and 3-(2-propenyl)$_2$-hydroxypropyl groups.

The proportion of repeating unit (a) is preferably 5 to 95%, more preferably 10 to 90%, particularly preferably 20 to 80%, based on the total number of monomers constituting the modified polyallylamine. In this case, the degree of hydroxyalkyl conversion, that is, the proportion of recurring units (c51) and/or (c52) based on the total number of recurring units (b) and (c51) and/or (c52), is preferably 60 to 100%, more preferably 90 to 100%, particularly preferably 95 to 100%, from the viewpoints of dissolvability and stability of the modified polyallylamine according to the present invention. The proportion of recurring unit (c52) based on the total number of recurring units (c51) and (c52) is preferably 60 to 100%, more preferably 90 to 100%, particularly preferably 95 to 100%, from the viewpoint of wastewater treatment.

The structure of the modified polyallylamine has been described above. When there are a plurality of monomer units which have modified allylamine, all the monomer units may be identical, or alternatively the plurality of monomer units may be different from each other.

The copolymer of N,N-dialkylallylamine with allylamine (hereinafter often referred to as "starting copolymer") may be synthesized by a method described, for example, in a pamphlet of WO 00/21901. N,N-dialkylallylamine monomer units contained in the starting copolymer include N,N-dimethylallylamine, N,N-diethylallylamine, N,N-dipropylallylamine, and N,N-dibutylallylamine. Further, N,N-dimethylallylamine is suitable from the viewpoint of a high level of dissolvability of the modification product.

The weight average molecular weight of the starting copolymer is preferably not more than 5,000, more preferably 200 to 3,000, particularly preferably 500 to 2,000. When the molecular weight is in the above-defined range, the resultant modified polyallylamine is well dissolved in a solvent constituting the ink. Further, in this case, the attack of components used in an ink jet recording apparatus is suppressed, and, advantageously, the component constituting an ink passage is not attacked.

The ratio of monomers in the starting copolymer is preferably 5/95 to 95/5, more preferably 10/90 to 90/10, particularly preferably 20/80 to 80/20.

The modified polyallylamine contained in the liquid composition according to the present invention can be prepared by reacting the starting copolymer with a reagent capable of converting an amino group to a substituent having 1 to 12 carbon atoms, for example, an N-carbamoylating reagent, an alkoxycarbonylating reagent, an allyloxycarbonylating reagent, an acylating reagent, or an acrylic compound capable of causing a Michael addition reaction or an optionally substituted 1,2-epoxyalkalne compound to modify a part or the whole of hydrogen atoms in —$NH_2$ in the allylamine monomer in the starting copolymer to "—NH-substituent" or/and "—N-disubstituent", thereby preparing a copolymer of N,N-dialkylallylamine with N-substituted allylamine.

In the present invention, the content of the modified polyallylamine may be properly determined from the viewpoints of improving the color developing properties and improving the gloss of records. In a preferred embodiment of the present invention, however, the content of the modified polyallylamine in the liquid composition is preferably 0.1 to 30% by weight, more preferably 0.1 to 10% by weight, still more preferably 0.5 to 5% by weight.

In the present invention, the modified polyallylamine and polyallylamine or its derivative may be added as a mixture. When a mixture of the modified polyallylamine with polyallylamine or its derivative is added, the total content of the modified polyallylamine and polyallylamine or its derivative is preferably 0.1 to 30% by weight, more preferably 0.1 to 10% by weight, still more preferably 0.5 to 5% by weight.

4. Polymer Fine Particles

In a preferred embodiment of the present invention, the liquid composition according to the present invention further comprises polymer fine particles. In the present invention, the polymer fine particles are preferably anionic polymer fine particles and/or nonionic polymer fine particles, more preferably a combination of one or more types of anionic polymer fine particles with one or more types of nonionic polymer fine particles.

In a preferred embodiment of the present invention, the polymer fine particles are added, to the liquid composition, as an emulsion prepared by dispersing (mixing) the polymer fine particles in an aqueous medium. The addition of the polymer fine particles as the emulsion can improve stability at the time of production of the liquid composition and the storage stability of the liquid composition and thus can further enhance reliability. Therefore, high-grade recorded images can be yielded.

In a preferred embodiment of the present invention, the emulsion is selected from the group consisting of emulsification-type emulsions, sol-type emulsions, anionic polyethylene emulsions or modification products thereof, anionic polypropylene emulsions or modification products thereof, and mixtures thereof. In an embodiment of the present invention, anionic polyethylene emulsions or anionic polypropylene emulsions are carboxylic acid modification products, sulfonic acid modification products or the like.

Preferably, the polymer fine particles have an average particle diameter of not more than 10 to 200 nm, a glass transition temperature (Tg; measured according to JIS K 6900) of 50° C. or below, a minimum film forming temperature (MTF) of 20° C. or below, and a weight average molecular weight (Mw) of 5,000 to 1,000,000, preferably 6,000 to 600,000.

In the present invention, the content of the polymer fine particles is preferably 0.1 to 20.0% by weight, more preferably 0.2 to 5.0% by weight, still more preferably 0.5 to 3.0% by weight, based on the total amount of the liquid composition. In the present specification, the content of the polymer fine particles is on a solid basis.

In the present invention, preferably, the liquid composition further comprises 0.1 to 30.0% by weight of polyethyleneimine or polyallylamine. This can significantly improve gloss in the recorded image in its nonprinted part.

Each type of polymer fine particles in a preferred embodiment of the present invention will be described.

(1) Anionic Polymer Fine Particles

Specific examples of preferred emulsions prepared by mixing and dispersing anionic polymer fine particles in an aqueous medium include emulsification-type emulsions, sol-type emulsions, anionic polyethylene emulsions or modification products thereof, anionic polypropylene emulsions or modification products thereof, and mixtures thereof. These emulsions will be described below.

(I) Emulsification-Type Emulsion

In the present invention, the "emulsification-type" emulsion refers to an emulsion in which a surfactant is used for dispersing monomers in a solvent in the synthesis of polymer fine particles and the diameter of the polymer fine particles constituting the emulsion is not less than about 70 μm.

The glass transition temperature (Tg; measured according to JIS K 6900) of the emulsification-type emulsion is preferably 30° C. or below, more preferably 10° C. or below, from the viewpoint of improving gloss and stability of the recorded image.

The weight average molecular weight (Mw) of the anionic polymer fine particles constituting the emulsification-type emulsion is preferably 100,000 to 1,000,000, more preferably 400,000 to 600,000, from the viewpoint of improving gloss and stability of the recorded image. When the weight average molecular weight (Mw) is in the above-defined range, the storage stability is enhanced and, in addition, the gloss of the recorded image in its nonprinted part can be improved.

The average particle diameter of the anionic polymer fine particles constituting the emulsification-type emulsion is preferably not less than 70 nm, more preferably 100 to 200 nm, particularly preferably 110 to 150 nm or less. Anionic polymer fine particles having an average particle diameter in the above-defined range are likely to cause the anionic polymer fine particles to form an emulsion in water, can enhance the storage stability, and can realize the formation of high-grade recorded images.

The minimum film forming temperature (MFT) of the emulsification-type emulsion is preferably 20° C. or below, more preferably 0° C. or below, from the viewpoints of improving gloss and improving the stability of the recorded image. When the minimum film forming temperature (MFT) is in the above-defined range, the gloss of the recorded image in its nonprinted part can be further improved.

(II) Sol-Type Emulsion

In the present invention, the "sol-type" emulsion refers to an emulsion in which the use of a surfactant is substantially unnecessary for dispersing monomers in a solvent in the synthesis of the polymer fine particles and the diameter of the polymer fine particles constituting the emulsion is not more than about 70 μm.

The glass transition temperature (Tg; measured according to JIS K 6900) of the sol-type emulsion is preferably 50° C. or below, more preferably 30° C. or below, still more preferably 20° C. or below from the viewpoint of improving gloss and stability of the recorded image.

The weight average molecular weight (Mw) of the anionic polymer fine particles constituting the sol-type emulsion is preferably 1,000 to 1,000,000, more preferably 3000 to 500,000, particularly preferably 5,000 to 15,000, from the viewpoint of improving gloss and stability of the recorded image. When the weight average molecular weight (Mw) is in the above-defined range, the ejection stability is enhanced and, in addition, the gloss of the recorded image in its nonprinted part can be improved.

The average particle diameter of the anionic polymer fine particles constituting the sol-type emulsion is preferably not more than 70 nm, more preferably not more than 50 nm. Anionic polymer fine particles having an average particle diameter in the above-defined range are likely to cause the anionic polymer fine particles to form an emulsion in water and thus to stabilize the sol-type dispersion state, can enhance the storage stability, and can realize the formation of high-grade recorded images.

The minimum film forming temperature (MFT) of the sol-type emulsion is preferably 20° C. or below, more preferably 0° C. or below, from the viewpoints of improving gloss and improving the stability of the recorded image. When the minimum film forming temperature (MFT) is in the above-defined range, the gloss of the recorded image in its nonprinted part can be further improved.

Specific examples of preferred sol-type emulsions include alkali soluble emulsions and sulfone group-containing emulsions.

In the alkali soluble emulsion, preferably, the pH value has been adjusted by the addition of a base, preferably an inorganic base, more preferably an alkali metal hydroxide or an alkaline earth metal hydroxide. Preferably, this emulsion has an acid value of 40 or less.

The alkali soluble emulsion is preferably an emulsion prepared by dispersing, in an aqueous medium, a polymer prepared by polymerizing an ethylenically unsaturated carboxylic acid monomer and a monomer copolymerizable with this monomer in the presence of an alcoholic hydroxyl group-containing water soluble polymeric compound or a copolymerizable surfactant.

Examples of the ethylenically unsaturated carboxylic acid monomer include: ethylenically unsaturated monocarboxylic acid monomers such as acrylic acid and methacrylic acid; ethylenically unsaturated polyhydric carboxylic acid monomers such as itaconic acid, maleic acid, fumaric acid, and butene tricarboxylic acid; partially esterified monomers of ethylenically unsaturated polyhydric carboxylic acids such as monobutyl fumarate, monobutyl maleate, and mono-2-hydroxypropyl maleate; polycarboxylic acid anhydrides such as maleic anhydride and citraconic anhydride; and the like. These monomers may be used alone or as a mixture of two or more. Among them, acrylic acid or methacrylic acid is particularly preferred.

The monomer copolymerizable with the ethylenically unsaturated carboxylic acid monomer is not particularly limited, and examples thereof include: aromatic vinyl monomers such as styrene, α-methylstyrene, vinyltoluene, and chlorostyrene; (meth)acrylic ester monomers such as methyl (meth)acrylate, ethyl(meth)acrylate, propyl(meth)acrylate, n-amyl(meth)acrylate, isoamyl(meth)acrylate, hexyl(meth)acrylate, ethylhexyl(meth)acrylate, octyl(meth)acrylate, hydroxyethyl(meth)acrylate, hydroxypropyl(meth)acrylate, and glycidyl(meth)acrylate; cyano group-containing ethylenically unsaturated monomers such as (meth)acrylonitrile; ethylenically unsaturated glycidyl ether monomers such as allylglycidyl ether; ethylenically unsaturated amide monomers such as (meth)acrylamide, N-methylol(meth)acrylamide, and N-butoxymethyl(meth)acrylamide; conjugated diene monomers such as 1,3-butadiene, isoprene, 2,3-dimethyl-1,3-butadiene, and 1,3-pentadiene; and vinyl carboxylate such as vinyl acetate. These monomers may be used alone or as a mixture of two or more. Among them, ethylenically unsaturated carboxylic ester monomers are preferred, and (meth)acrylic ester monomers such as methyl(meth)acrylate and ethyl(meth)acrylate are particularly preferred, from the viewpoint of excellent lightfastness and gloss of the recorded image.

The alcoholic hydroxyl-containing water soluble polymeric compound is preferably a vinyl alcohol polymer, specifically a water soluble polymeric compound containing 5 to 25 alcoholic hydroxyl groups per the molecular weight of 1000. Specific examples of such polymeric compounds include: vinyl alcohol polymers such as polyvinyl alcohol and various modification products thereof; saponification products of a copolymer of vinyl acetate with acrylic acid, methacrylic acid, or maleic anhydride; cellulose derivatives such as alkylcellulose, hydroxyalkylcellulose, and alkylhydroxyalkylcellulose; starch derivatives such as alkyl starch and carboxylmethyl starch; gum arabic and tragacanth; and polyalkylene glycol. They may be used alone or as a mixture of two or more.

The copolymerizable surfactant is a surfactant containing one or more polymerizable vinyl groups per molecule. Specific examples of surfactants usable herein include: anionic polymerizable surfactants, such as sodium propenyl-2-ethylhexylsulfosuccinate, (meth)acrylic acid polyoxyethylene-sulfate, ammonium polyoxyethylene alkylpropenyl ethersulfate, and (meth)acrylic acid polyoxyethylene ester phosphate; and nonionic polymerizable surfactants such as polyoxyethylene alkylbenzene ether(meth)acrylate, and polyoxyethylene alkyl ether(meth)acrylate. They may be used alone or as a mixture of two or more. Among these copolymerizable surfactants, ammonium polyoxyethylene alkylpropenyl ethersulfate is suitable from the viewpoint of excellent balance between monomer emulsion dispersing properties and copolymerizability with the monomer.

The sulfonic acid group-containing emulsion is preferably a dien sulfonic acid group-containing emulsion or a nondiene sulfonic acid group-containing emulsion.

An emulsion prepared by sulfonating a polymer or copolymer prepared by homopolymerizing or copolymerizing a monomer which will be described later (see Japanese Patent Laid-Open No. 217525/1999), or an emulsion prepared by dispersing a polymer, prepared by homopolymerizing or copolymerizing a sulfonated monomer, in an aqueous medium may be mentioned as the sulfonic acid group-containing emulsion, and examples thereof include diene sulfonic acid group-containing emulsions comprising a diene monomer as an indispensable component or nondiene sulfonic acid group-containing emulsions in which the diene monomer is not an indispensable component.

Monomers usable for providing the diene sulfonic acid group-containing emulsion include diene monomers and other monomers usable in combination with diene monomers.

Specific examples of diene monomers are diene compounds having 4 to 10 carbon atoms, and examples thereof include, 1,3-butadiene, 1,2-butadiene, 1,3-pentadiene, 1,2-pentadiene, 2,3-pentadiene, isoprene, 1,2-hexadiene, 1,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, and cycloheptadiene. They may be used alone or as a mixture of two or more.

Specific examples of other monomers usable in combination with diene monomers include: aromatic monomers, such as styrene, α-methylstyrene, o-methylstyrene, p-methylstyrene, m-methylstyrene and vinylnaphthalene; alkyl(meth)acrylates, such as methyl(meth)acrylate, ethyl(meth)acrylate, and butyl(meth)acrylate; mono- or dicarboxylic acids or dicarboxylic anhydrides, such as (meth)acrylic acid, crotonic acid, maleic acid, and itaconic acid; vinyl cyanide compounds such as (meth)acrylonitrile; and unsaturated compounds, such as vinyl chloride, vinylidene chloride, vinylmethyl ethyl ketone, vinyl acetate, (meth)acrylamide, glycidyl(meth)acrylate. They may be used alone or as a mixture of two or more.

When these other monomers are used in combination with the diene monomer, the amount of the diene monomer used is preferably not less than 0.5% by weight, more preferably not less than 1% by weight, still more preferably not less than 5% by weight.

The diene co-emulsion prepared by copolymerizing the diene monomer and other monomer usable in combination with the diene monomer may be any copolymer including random copolymers and block copolymers.

Preferred polymers include, for example, isoprene homopolymer, butadiene homopolymer, isoprene-styrene random copolymer, isoprene-styrene block copolymer, styrene-isoprene-styrene ternary block copolymer, butadiene-styrene random copolymer, butadiene-styrene block copolymer, styrene-butadiene-styrene block copolymer, styrenebutadiene-styrene ternary block copolymer, and ethylene-propylene-diene ternary block copolymer. More preferred copolymers include, for example, isoprene-styrene block copolymer, styrene-isoprene-styrene ternary block copolymer, butadiene-styrene block copolymer, styrene-butadiene-styrene block copolymer, and styrene-butadiene-styrene ternary block copolymer.

The diene sulfonic acid group-containing polymer used in the present invention may be one prepared by sulfonating a polymer, prepared by hydrogenating a part or the whole of the remaining double bonds based on the above diene polymer and/or its precursor monomer, by a conventional sulfonation method, for example, a method described, for example, in Shin Jikken Kagaku Kouza (New Course of Experimental Chemistry) (vol. 14-III. p. 1773), edited by The Chemical Society of Japan, or Japanese Patent Laid-Open No. 227403/1990.

Sulfonating agents include, for example, sulfuric anhydride, sulfuric acid, chlorosulfonic acid, fuming sulfuric acid, or bisulfites (for example, Li salt, Na salt, K salt, Rb salt, or Cs salt). The amount of the sulfonating agent used is preferably 0.005 to 1.5 moles, more preferably 0.01 to 1.0 mole, in terms of sulfuric anhydride based on one mole of the above polymer.

The diene sulfonic acid group-containing emulsion is preferably used in such a state that has been prepared by allowing water and/or a basic compound to act on the above sulfonation product. Basic compounds include alkali metal hydroxides, alkali metal alkoxides, alkali metal carbonates, aqueous ammonia, organometal compounds, and amines. The basic compounds may be used either solely or in a combination of two or more. The amount of the basic compound used is not more than 2 moles, preferably not more than 1.3 moles, based on one mole of the sulfonating agent used.

Monomers usable for providing the nondiene sulfonic acid group-containing emulsion include, for example, vinyl monomers, such as methacrylsulfonic acid, prepared by reacting allylsulfonic acid, vinylsulfonic acid, or isobutylene with sulfur trioxide, or styrenic monomers, such as sodium p-styrenesulfonate (for example, Spinomar, manufactured by TOSOH CORPORATION), or sulfonyl-containing monomers such as methacrylic ester monomers represented by general formula $CH_2=C(CH_3)-COO(AO)_nSO_3Na$ (A: lower alkylene group) (for example, Eleminol RS-30, manufactured by Sanyo Chemical Industries, Ltd.), and sodium salts, potassium salts, or lithium salts of the above monomers.

The nondiene sulfonic acid group-containing emulsion may also be prepared by copolymerizing the above sulfonic acid group-containing monomer with a sulfonic acid group-free monomer.

Copolymerizable other monomers include: aromatic monovinyl compounds such as styrene, ethyl vinyl benzene, α-methylstyrene, fluorostyrene, and vinylpyrine; acrylic ester monomers such as butyl acrylate, 2-ethylhexyl acrylate, β-methacryloyloxyethyl hydrogenphthalate, and N,N'-dimethylaminoethyl acrylate; methacrylic ester monomers such as 2-ethylhexyl methacrylate, methoxydiethylene glycol methacrylate, methoxypolyethylene glycol methacrylate, methyl methacrylate, ethyl methacrylate, butyl methacrylate, N,N'-dimethylaminoethyl methacrylate, and glycidyl methacrylate; vinyl cyanide compounds such as acrylonitrile and methacrylonitrile; silicone-modified monomers; and macromonomers. Further, conjugated double bond compounds such as butadiene and isoprene, vinyl ester compounds such as vinyl acetate, 4-methyl-1-pentene, and other α-olefin compounds may be mentioned as copolymerizable other monomers. Among the copolymerizable monomers, styrene, methyl methacrylate, and acrylonitrile are preferred.

The amount of the copolymerizable monomer used is generally 1 to 93% by weight, preferably 5 to 80% by weight, based on the polymerizable monomer.

The nondiene sulfonic acid group-containing emulsion is prepared by radically polymerizing the above sulfonic acid group-containing monomer, or the sulfonic acid group-containing monomer and the copolymerizable other monomer, for example, in a solvent for polymerization, for example, water or an organic solvent, in the presence of a radical polymerization initiator, a chain transfer agent and the like.

The nondiene sulfonic acid group-containing emulsion prepared by copolymerizing the above nondiene monomer may be any copolymer including random copolymer and block copolymer. (III) Anionic polyethylene emulsion or its modification product, and anionic polypropylene emulsion or its modification product The melting point of the anionic polyethylene emulsion or its modification product, and anionic polypropylene emulsion or its modification product is preferably 70° C. or above from the viewpoint of improving gloss and stability of the recorded image. The particle diameter of the emulsion is preferably not more than 200 nm, and the average particle diameter is preferably not more than 160 nm.

The anionic polyethylene emulsion may be a commercially available product, and examples thereof include AQUACER 507 available from BYK-Chemie Japan KK. AQUACER 507 is an anionic oxidized high-density polyethylene emulsion and has a melting point of 130° C., a pH value of 10, a particle diameter of 100 nm to 200 nm, and an average particle diameter of 150 nm.

(2) Nonionic Polymer Fine Particles

Specific examples of the emulsion prepared by mixing and dispersing nonionic polymer fine particles in an aqueous medium include nonionic polyethylene emulsions or modification products thereof, nonionic polypropylene emulsions or modification products thereof, and mixtures thereof.

The melting point of the nonionic polyethylene emulsion or its modification product, or polypropylene emulsion or its modification product is preferably 70° C. or above from the viewpoint of improving gloss and stability of the recorded image. The particle diameter of the emulsion is preferably not more than 200 nm, and the average particle diameter is preferably not more than 160 nm.

These emulsions may be commercially available products, and examples thereof include AQUACER 513, AQUACER 593, and AQUACER 543 and the like available from BYK-Chemie Japan KK.

AQUACER 513 is a nonionic oxidized high-density polyethylene emulsion and has a melting point of 130° C., a pH value of 9, a particle diameter of 100 to 200 nm, and an average particle diameter of 150 nm. AQUACER 593 is a nonionic oxidized high-density polypropylene emulsion and has a melting point of 160° C., a pH value of 9, a particle diameter of 100 to 200 nm, and an average particle diameter of 150 nm. AQUACER 543 is one prepared by incorporating nonylphenol in AQUACER 593.

5. Water and Organic Solvent

The liquid composition in the present invention comprises water and an organic solvent.

Water may be pure water such as ion exchanged water, ultrafiltered water, reverse osmosed water, and distilled water, or ultrapure water. Further, water, which has been sterilized, for example, by ultraviolet irradiation or by addition of hydrogen peroxide, is preferred, because this treatment can prevent the growth of mold or bacteria and, thus, the ink composition can be stored for a long period of time.

For example, glycol ether compounds, alkyldiol compounds, and polyhydric alcohol compounds may be used as the organic solvent contained in the liquid composition according to the present invention. The use of these compounds as the organic solvent can realize excellent anti-clogging properties and ejection stability and can enhance the image quality of the recorded image without significantly deteriorating the color developing properties and gloss.

The content of these compounds (the total content in the case where a plurality of types of compounds are mixed together) is preferably not less than 1.0% by weight and not more than 70% by weight, more preferably 10 to 50% by weight, based on the liquid composition from the viewpoint of improving the image quality.

Examples of glycol ether compounds include triethylene glycol monobutyl ether, diethylene glycol monobutyl ether, propylene glycol monomethyl ether, diethylene glycol monoethyl ether, diethylene glycol monomethyl ether. Triethylene glycol monobutyl ether is particularly preferred.

The content of the glycol ether compound is preferably 0.1 to 30.0% by weight, more preferably 1.0 to 20.0% by weight, particularly preferably 2.0 to 10.0% by weight, based on the liquid composition.

Examples of alkyl diol compounds include 1,2-hexanediol, 1,2-pentanediol, 2-butene-1,4-diol, 2-ethyl-1,3-hexanediol, and 2-methyl-2,4-pentanediol. 1,2-Hexanediol is particularly preferred.

The content of the alkyldiol compound is preferably 0.1% by weight to 30.0% by weight, more preferably 1.0 to 20.0% by weight, particularly preferably 2.0 to 10.0% by weight, based on the liquid composition.

Polyhydric alcohol compounds include water soluble organic solvents such as glycerin, ethylene glycol, triethylene glycol, propylene glycol, diethylene glycol, pentamethylene glycol, trimethylene glycol, dipropylene glycol, and tetraethylene glycol. Glycerin is particularly preferred.

The content of the polyhydric alcohol compound is preferably 0.1% by weight to 50.0% by weight, more preferably 1.0 to 40.0% by weight, particularly preferably 8.0 to 30.0% by weight, based on the liquid composition.

The liquid composition according to the present invention may further contain any of an acetylene glycol compound, an acetylene alcohol compound, or a polysiloxane compound as the surfactant. This can enhance the ejection stability of the liquid composition without significantly deteriorating the color developing properties and gloss.

The content of the surfactant in the liquid composition is preferably 0.1 to 10.0% by weight, more preferably 0.1 to 3.0% by weight, particularly preferably 0.3 to 2.0% by weight.

When the surfactant is added, the surface tension of the liquid composition is preferably 15 to 45 dyn/cm, more preferably 20 to 40 dyn/cm, particularly preferably 25 to 35 dyn/cm, from the viewpoint of improving the penetration.

In the present invention, the acetylene glycol compound which is preferably used as the surfactant may be a commercially available product, and examples thereof include OLFINE E 1010, OLFINE STG, and OLFINE Y (tradenames: manufactured by Nissin Chemical Industry Co., Ltd.), SURFYNOL 82, SURFYNOL 104, SURFYNOL 440, SURFYNOL 465, and SURFYNOL 485 (tradenames: manufactured by Air Products and Chemicals Inc.).

Acetylene alcohol compounds which are preferably used in the present invention include, for example, 3,5-dimethyl-1-hexyne-3-ol, and 2,4-dimethyl-5-hexyne-3-ol and Surfynol 61 (tradename: manufactured by Air Products and Chemicals Inc.).

Polysiloxane compounds which are preferably used in the present invention include compounds represented by the following general formula.

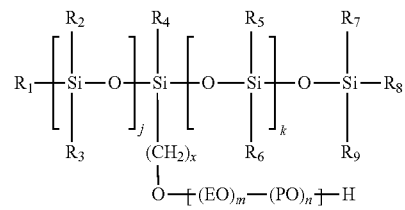

wherein $R_1$ to $R_9$ independently represent a $C_1$ to $C_6$ alkyl group; j, k, and x are independently an integer of one or more; EO represents an ethyleneoxy group; PO represents a propyleneoxy group; m and n are integer of 0 (zero) or more, provided that m+n is an integer of 1 or more and recurring units EO and PO may be arranged in any order and in a random or block form.

Specifically, for example, BYK 347 and BYK 348, manufactured by BYK-Chemie Japan KK may be used.

6. Other Ingredients

The liquid composition according to the present invention may if necessary further comprise a solvent which is commonly used in water-based ink compositions for ink jet recording. Such solvents include 2-pyrrolidone, triethanolamine, and saccharides.

Specific examples of saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. The polysaccharide refers to sugar in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbit. Further, commercially available products such as HS-300 and HS-500 (registered trademarks, manufactured by HAYASHIBARA SHOJI, INC Group Corporation) are also usable.

The liquid composition according to the present invention may further contain, for example, anti-clogging agents for nozzles, preservatives, antioxidants, electric conductivity adjustors, pH adjustors, viscosity modifiers, surface tension modifiers, oxygen absorbers, ultraviolet absorbers, and chelating agents.

Specific examples of preservatives include sodium benzoate, pentachlorophenol sodium, 2-pyridinethiol-1-oxide sodium, sodium sorbate, sodium dehydroacetate, and 1,2-dibenzisothiazolin-3-one (PROXEL CRL, PROXEL BDN, PROXEL GXL, PROXEL XL-2, and PROXEL TN, manufactured by Avecia).

Specific examples of pH adjustors, solubilizers, or antioxidants include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof. Specific examples of ultraviolet absorbers include Tinuvin 328, Tinuvin 900, Tinuvin 1130, Tinuvin 384, Tinuvin 292, Tinuvin 123, Tinuvin 144, Tinuvin 622, Tinuvin 770, Tinuvin 292, Irgacor 252, Irgacor 153, Irganox 1010, Irganox 1076, Irganox 1035, and MD 1024, manufactured by Ciba-Geigy, and lanthanide oxides. Specific examples of chelating agents include ethylenediaminetetraacetic acid (EDTA).

Further, the liquid composition may further contain an organic solvent such as alcohols from the viewpoint of modifying the viscosity and regulating feathering or bleeding on records. Specific examples thereof include methanol, ethanol, n-propyl alcohol, i-propyl alcohol, n-butanol, sec-butanol, tert-butanol, i-butanol, and n-pentanol. Particularly preferred are monohydric alcohols.

The content of the high-boiling organic solvent is preferably 0.1 to 30.0% by weight, more preferably 1.0 to 10.0% by weight, particularly preferably 2.0 to 5.0% by weight, based on the liquid composition.

7. Ink Composition

In the ink jet recording method according to another aspect of the present invention, both the liquid composition and an ink composition are printed on a recording medium. The ink composition comprises at least a colorant, water, and a water soluble organic solvent. Individual ingredients constituting the ink composition will be described.

(1) Colorant

The ink composition comprises a pigment or a dye as a colorant. Preferably, the colorant is a pigment. Inorganic pigments and organic pigments are utilizable as the pigment. Inorganic pigments usable herein include, in addition to titanium oxide and iron oxide, carbon blacks produced by conventional processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), pigment chelates (for example, basic pigment chelates and acid pigment chelates), nitro pigments, nitroso pigments, and aniline black.

Carbon blacks usable for black inks include: carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Colombian Carbon Co., Ltd., for example, RAVEN 5750, RAVEN 5250, RAVEN 5000, RAVEN 3500, RAVEN 1255, and RAVEN 700; carbon blacks manufactured by Cabot Corporation, for example, REGAL 400 R, REGAL 330 R, Regal REGAL 660 R, MOGUL L, MONARCH 700, MONARCH 800, MONARCH 880, MONARCH 900, MONARCH 1000, MONARCH 1100, MONARCH 1300, and MONARCH 1400; and carbon blacks manufactured by Degussa, for example, COLOR BLACK FW 1, COLOR BLACK FW 2, COLOR BLACK FW 2 V, COLOR BLACK FW 18, Color Black COLOR BLACK FW 200, COLOR BLACK S 150, COLOR BLACK S 160, COLOR BLACK S 170, PRINTEX 35, PRINTEX U, PRINTEX V, PRINTEX 140 U, SPECIAL BLACK 6, SPECIAL BLACK 5, SPECIAL BLACK 4 A, and SPECIAL BLACK 4.

Pigments usable for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14 C, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 108, C.I. Pigment Yellow 109, C.I. Pigment Yellow 110, C.I. Pigment Yellow 113, C.I. Pigment Yellow 114, C.I. Pigment Yellow 116, C.I. Pigment Yellow 117, C.I. Pigment Yellow 120, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 150, C.I. Pigment Yellow 151, C.I. Pigment Yellow 153, C.I. Pigment Yellow 154, C.I. Pigment Yellow 155, C.I. Pigment Yellow 156, C.I. Pigment Yellow 167, C.I. Pigment Yellow 172, C.I. Pigment Yellow 173, C.I. Pigment Yellow 180, C.I. Pigment Yellow 185, and C.I. Pigment Yellow 195.

Pigments usable for magenta inks include C.I. Pigment Red 1, C.I. Pigment Red 2, C.I. Pigment Red 3, C.I. Pigment Red 5, C.I. Pigment Red 7, C.I. Pigment Red 9, C.I. Pigment Red 10, C.I. Pigment Red 11, C.I. Pigment Red 12, C.I. Pigment Red 14, C.I. Pigment Red 17, C.I. Pigment Red 18, C.I. Pigment Red 23, C.I. Pigment Red 30, C.I. Pigment Red 31, C.I. Pigment Red 38, C.I. Pigment Red 42, C.I. Pigment Red 48 (Ca), C.I. Pigment Red 48 (Mn), C.I. Pigment Red 57 (Ca), C.I. Pigment Red 57:1, C.I. Pigment Red 67, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 147, C.I. Pigment Red 149, C.I. Pigment Red 150, C.I. Pigment Red 151, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245 and C.I. Pigment Violet 19.

Pigments usable for cyan inks include C.I. Pigment Blue 1, C.I. Pigment Blue 2, C.I. Pigment Blue 3, C.I. Pigment Blue 15:1, C.I. Pigment Blue 15:2, C.I. Pigment Blue 15:3, C.I. Pigment Blue 15:4, C.I. Pigment Blue 15:5, C.I. Pigment Blue 15:34, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Pigments usable for red inks include C.I. Pigment Red 17, C.I. Pigment Red 49:2, C.I. Pigment Red 112, C.I. Pigment Red 149, C.I. Pigment Red 177, C.I. Pigment Red 178, C.I. Pigment Red 188, C.I. Pigment Red 255, and C.I. Pigment Red 264.

Pigments usable for violet inks include C.I. Pigment Violet 3, C.I. Pigment Violet 9, C.I. Pigment Violet 19, C.I. Pigment Violet 23, C.I. Pigment Violet 31, C.I. Pigment Violet 32, C.I. Pigment Violet 33, C.I. Pigment Violet 36, C.I. Pigment Violet 38, C.I. Pigment Violet 43, and C.I. Pigment Violet 50.

The particle diameter of the pigments is preferably not more than 200 nm, more preferably not more than 100 nm.

The content of the pigment is 0.01 to 10% by weight, preferably 0.1 to 6.0% by weight, more preferably 0.5 to 4.0% by weight, based on the ink composition.

The pigment as the colorant is preferably added, to the ink, as a pigment dispersion which has been prepared with the aid of a dispersant. Naturally occurring polymers may be mentioned as the dispersant. Specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxycellulose.

Preferred dispersants include synthetic polymers, and examples thereof include: polyvinyl alcohols; polyvinyl pyrrolidones; acrylic resins, such as polyacrylic acid, acrylic acid-acrylonitrile copolymer, potassium acrylate-acrylonitrile copolymer, vinyl acetate-acrylic ester copolymer, and acrylic acid-acrylic ester copolymer; styrene-acryl resins, such as styrene-acrylic acid copolymer, styrene-methacrylic acid copolymer, styrene-methacrylic acid-acrylic ester copolymer, styrene-α-methylstyrene-acrylic acid copolymer, and styrene-α-methylstyrene-acrylic acid-acrylic ester copolymer; styrene-maleic acid copolymer; styrene-maleic anhydride copolymer; vinyinaphthalene-acrylic acid copolymer; vinylnaphthalene-maleic acid copolymer; vinyl acetate copolymers, such as vinyl acetate-ethylene copolymer, vinyl acetate-fatty acid vinylethylene copolymer, vinyl acetate-maleic ester copolymer, vinyl acetate-crotonic acid copolymer, and vinyl acetate-acrylic acid copolymer; and salts of the above polymers.

Among them, a copolymer of a monomer having a hydrophobic group with a monomer having a hydrophilic group and a polymer of a monomer having both a hydrophobic group and a hydrophilic group in its molecular structure are particularly preferred. The copolymer may be any of random copolymer and block copolymer. Examples of the above-described salts include salts with diethylamine, ammonia, ethylamine, triethylamine, propylamine, isopropylamine, dipropylamine, butylamine, isobutylamine, triethanolamine, diethanolamine, aminomethylpropanol, morpholine and the like.

The weight average molecular weight of these copolymers is about 1,000 to 1,000,000, preferably about 3,000 to 500,000, more preferably 5,000 to 300,000.

When the following self-dispersible pigment is used as the pigment, there is no need to add any dispersant. On the other hand, when the self-dispersible pigment is not used, the content of the dispersant is 0.001 to 14.0% by weight, preferably 0.01 to 9.0% by weight, particularly preferably 0.05 to 6.0% by weight.

The ink composition according to the present invention may preferably utilize, as a colorant, a pigment which can be dispersed and/or dissolved in water without any dispersant, that is, a pigment generally known as a self-dispersible pigment. This pigment is one prepared by subjecting the pigment to surface treatment so that at least one type of functional group, such as carbonyl groups, carboxyl groups, hydroxyl groups, or sulfone groups, or salts thereof is bonded to the surface of the pigment, thereby rendering the pigment dispersible and/or dissolvable in water without any dispersant. Specifically, this surface treated pigment may be prepared by grafting a functional group or a molecule containing a functional group onto the surface of the pigment by physical treatment, such as vacuum plasma, or chemical treatment (for example, oxidation treatment with hypochlorous acid, sulfonic acid or the like). In the present invention, a single type or a plurality of types of functional groups may be grafted onto one pigment particle. The type of the functional group to be grafted and the degree of grafting may be suitably determined by taking the dispersion stability in the ink, the color density, the drying property at the front face of the ink jet head and the like into consideration. The pigment utilized in the self-dispersible pigment may be the same as the above pigment.

In the present invention, when the pigment is stably present in water without any dispersant, this state is expressed as the state of "dispersion and/or dissolution." Not infrequently, it is difficult to clearly distinguish the state of dissolution of a material from the state of dispersion of the material. In the present invention, any pigment can be used so far as the pigment can stably exist in water without any dispersant, independently of whether the pigment is in a dispersion form or a solution form. Therefore, in the present specification, a pigment, which can stably exist in water without any dispersant, is sometimes referred to as a "colorant." The pigment in this case, however, does not exclude a pigment which is in the state of dispersion.

(2) Water, Organic Solvent, and Other Ingredients

The ink composition according to the present invention comprises water and a water soluble organic solvent. Water, the organic solvent, and other ingredients may be the same as those in the liquid composition.

The ink composition according to the present invention may be prepared by a conventional method, for example, by dispersing and mixing the above individual ingredients by a suitable method. A preferred method is as follows. The ion exchanged water, the pigment, the dispersant, the organic solvent and optionally other ingredients are first mixed together in a suitable dispergator (for example, a ball mill, a sand mill, an attritor, a roll mill, an agitator mill, a Henschel mixer, a colloid mill, an ultrasonic homogenizer, a jet mill, or an angmill) to prepare a homogeneous pigment dispersion. Separately, the ion exchanged water, the organic solvent, and optionally other ingredients are thoroughly stirred at room temperature to prepare an ink solvent. The above pigment dispersion is gradually added dropwise to the ink solvent while stirring with a suitable dispergator, and the mixture is thoroughly stirred. After thorough stirring, coarse particles and foreign materials causative of clogging are removed by filtration to prepare a desired ink composition.

When a self-dispersible pigment is used as the colorant, an ink composition may be prepared in the same manner as described above, except that the pigment is surface treated to render the pigment per se to a dispersed state.

8. Ink Cartridge

According to another aspect of the present invention, there is provided an ink cartridge comprising the above liquid composition contained therein. To constitute the ink cartridge, the liquid composition may be contained alone, or alternatively both the liquid composition and the ink composition may be contained.

9. Recording Method

According to still another aspect of the present invention, there is provided a recording method comprising the step of depositing a liquid composition and an ink composition onto a recording medium to perform recording. In a preferred embodiment according to the present invention, recording is carried out by ejecting droplets of the liquid composition and the ink composition by ink jet recording onto a recording medium to perform printing.

In the ink jet recording method according to the present invention, the liquid composition and the ink composition may be ejected during the same treatment period. The term "during the same treatment period" as used herein refers to the practice of treatment in such a manner that one specific image is formed by both the liquid composition and the ink composition within single recording (one pass). Accordingly, "during the same treatment period" refers to the case where includes not only the case where both the liquid composition and the ink composition are simultaneously ejected, but also that case where, in one pass, the ink composition is first ejected before the liquid composition is ejected, and the case where, in one pass, the liquid composition is first ejected before the ink composition is ejected.

Further, the ink jet recording method according to the present invention may be carried out in such a manner that both the liquid composition and the color ink composition are deposited onto a recording medium to perform recording and the recorded face may be heat treated at a temperature at or above the glass transition temperature of the polymer fine particles. The heat treatment can further improve the gloss of the nonprinted part.

In a preferred embodiment of the present invention, there is provided a recording method in which an ink composition is printed on a recording medium, and, thereafter or during the same treatment period, the liquid composition is printed at least in a region where printing is not carried out by the ink composition. According to this recording method, for example, for high-gloss specialty paper for ink jet recording (hereinafter referred to as "gloss paper") such as PM photographic paper manufactured by Seiko Epson Corporation, the gloss of the printed part formed by the ink composition can be made substantially identical to the gloss of the nonprinted part to suppress gloss irregularity.

According to a further aspect of the present invention, there is provided a method in which the liquid composition is also printed in the printed part formed by the ink composition. According to this method, in gross paper, the gloss of the printed part formed by the ink composition can be rendered more close to the gloss of the nonprinted part to suppress the gloss irregularity. Further, in plain paper, an improvement in color development of the ink composition and the suppression of color spots can be realized. This advantage is particularly significant for recycled paper, and highly water repellent and highly waterfast paper such as postal cards.

In the recording method using the liquid composition according to the present invention, when the recording medium is gloss paper, advantages such as an improvement in gloss and suppression of gloss irregularity can be achieved, while, when the recording medium is plain paper, advantages such as an improvement in color development and suppression of color spots can be achieved. Accordingly, in the recording method using the liquid composition according to the present invention, the occurrence of spots derived from the influence of the recording medium can be suppressed without particular limitation to the type of the recording medium.

Further, in another preferred embodiment of the present invention, there is provided a method in which in the ink jet recording method according to the present invention, the liquid composition and the ink composition are printed on a recording medium in such a manner that the amount of the liquid composition ejected and the amount of the ink composition ejected are regulated so that the gloss in the printed region and the gloss in the nonprinted region in the recording medium are substantially identical to each other. This recording method is carried out in the same manner as that described in detail in a pamphlet of International Publication WO 02/08788. According to this method, the gloss ratio which depends upon the difference in level of duty in the printed matter can be minimized (maximum gloss/minimum gloss being 1 or around 1), and, thus, high-grade images free from uneven gloss can be realized.

In a preferred embodiment of means for regulating the amount of the liquid composition ejected and the amount of the ink composition ejected, the regulation is carried out by taking advantage of the duty value of the ink composition. Specifically, a method may be adopted in which, when the duty of the ink composition is low, the amount of the liquid composition ejected is increased, while, when the duty of the ink composition is high, the amount of the liquid composition ejected is reduced. Preferably, when the duty of the ink composition is in the range of 20 to 60%, especially in the range of 30 to 50%, the amount of the liquid composition ejected is regulated.

In another preferred method, when the duty of the ink composition is low, the total of the amount of the ink composition ejected and the amount of the liquid composition ejected is regulated to a given level, while, when the duty of the ink composition is high, independently of the duty of the ink composition, the amount of the liquid composition ejected is regulated to a given and low level. For example, when the duty of the ink composition is low, the total of the amount of the ink composition ejected and the amount of the liquid composition ejected is regulated to a value in the range of 20 to 60% in terms of the total of the duty values, while, when the duty of the ink composition is high, the amount of the liquid composition ejected is regulated to a given value in the range of 1 to 20% in terms of duty.

10. Ink Jet Recording Apparatus

The ink jet recording apparatus which can carry out the ink jet recording method according to the present invention will be described in conjunction with the accompanying drawings.

FIG. 1 is a diagram showing an embodiment of the ink jet recording apparatus in which an ink composition and a liquid composition are reservoired in respective tanks and are supplied to a recording head through an ink tube. Specifically, a recording head 1 is in communication with an ink tank 2 through an ink tube 3. The inside of the ink tank 2 is partitioned into a chamber for an ink composition, optionally chambers for a plurality of color ink compositions, and a chamber for a liquid composition.

The recording head 1 is moved by a timing belt 6 driven by a motor 5 along a carriage 4. On the other hand, paper 7 as a recording medium is placed by a platen 8 and a guide 9 at a position facing the recording head 1. In this embodiment, a cap 10 is provided. A suction pump 11 is connected to this cap 10 for performing the so-called "cleaning operation." The sucked liquid composition and ink composition are reservoired in a waste ink tank 13 through the tube 12. In the present invention, good cleaning operation can be realized without residence of the liquid composition in the cap 10.

A porous material such as a nonwoven fabric is sometimes provided within the cap 10 from the viewpoint of suppressing foaming of a waste ink during cleaning operation. This porous material may be optionally provided depending upon conditions of foams formed depending upon the method of cleaning or the type of the ink composition and liquid composition used. The provision of the porous material, however, is preferred from the viewpoint of preventing clogging.

FIG. 2 is an enlarged view showing the surface of nozzles for the recording head 1. In the drawing, the surface of nozzles for the liquid composition is indicated by 1b, and nozzles 21 for ejecting the liquid composition is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24, and 25.

Further, an ink jet recording method using the recording head shown in FIG. 2 will be described with reference to FIG. 3. The recording head 1 is moved in the direction indicated by an arrow A, during which time the liquid composition is ejected through the nozzle surface 1b to form a liquid composition-deposited region 31 in a band form on the recording medium 7. Subsequently, the recording medium 7 is transferred by a predetermined extent in the recording medium feed direction indicated by an arrow B, during which time the recording head 1 is moved in the direction opposite to that indicated by the arrow A in the drawing and returned to the left end of the recording medium 7, and the recording head 1 conducts printing using the ink composition on the liquid composition-deposited region where the liquid composition has already been deposited, thereby forming a print region 32.

Further, as shown in FIG. 4, in the recording head 1, it is also possible to arrange all nozzles in the lateral direction to construct a nozzle assembly. In the drawing, ejection nozzles for a liquid composition are denoted by 41a and 41b, and a yellow ink composition, a magenta ink composition, a cyan ink composition, and a black ink composition are ejected respectively through nozzles 42, 43, 44, and 45. In the recording head according to this embodiment, the recording head 1, when reciprocated on the carriage, can conduct printing in both directions. Therefore, in this case, printing at a higher speed can be expected as compared with the case where the recording head shown in FIG. 2 is used.

Regulating the surface tension of the liquid composition and the ink composition preferably by the above method enables a high-quality print to be more stably provided independently of the order of depositing the liquid composition and the ink composition. In this case, the use of only one ejection nozzle for the liquid composition suffices for desired results (for example, the nozzle indicated by numeral 41b in the drawing may be omitted), leading to a further reduction in size of head and an increase in printing speed.

In the ink jet recording apparatus, the supplement of the ink composition may be carried out by replacing a cartridge as an ink tank. The ink tank may be integral with the recording head.

Figure 5:
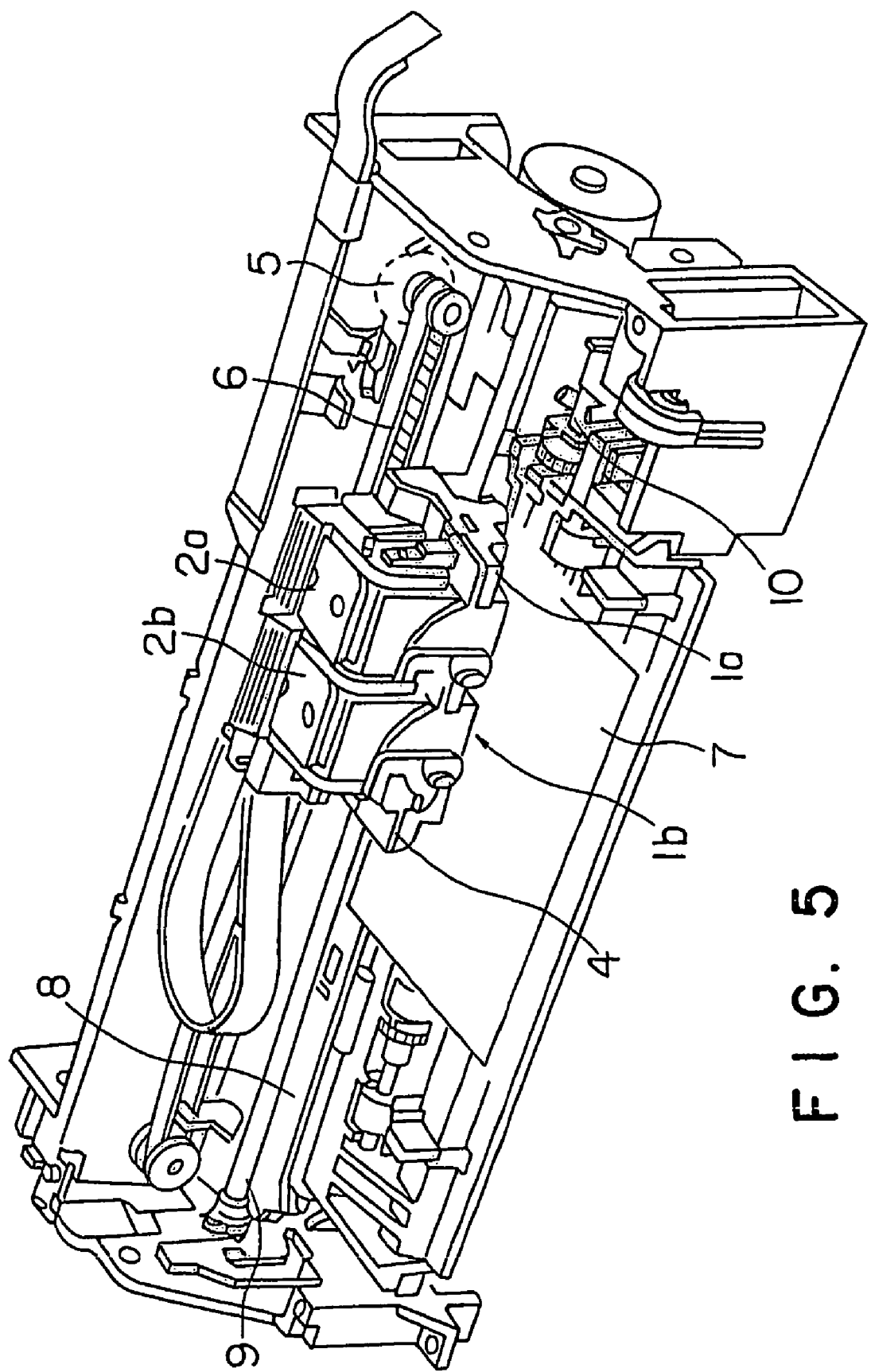
FIG. 5 is a schematic diagram of an ink jet recording apparatus which can realize the recording method according to the present invention.

A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a liquid composition are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1b is moved together with the ink tank 2b on the carriage 4.

Figure 6:
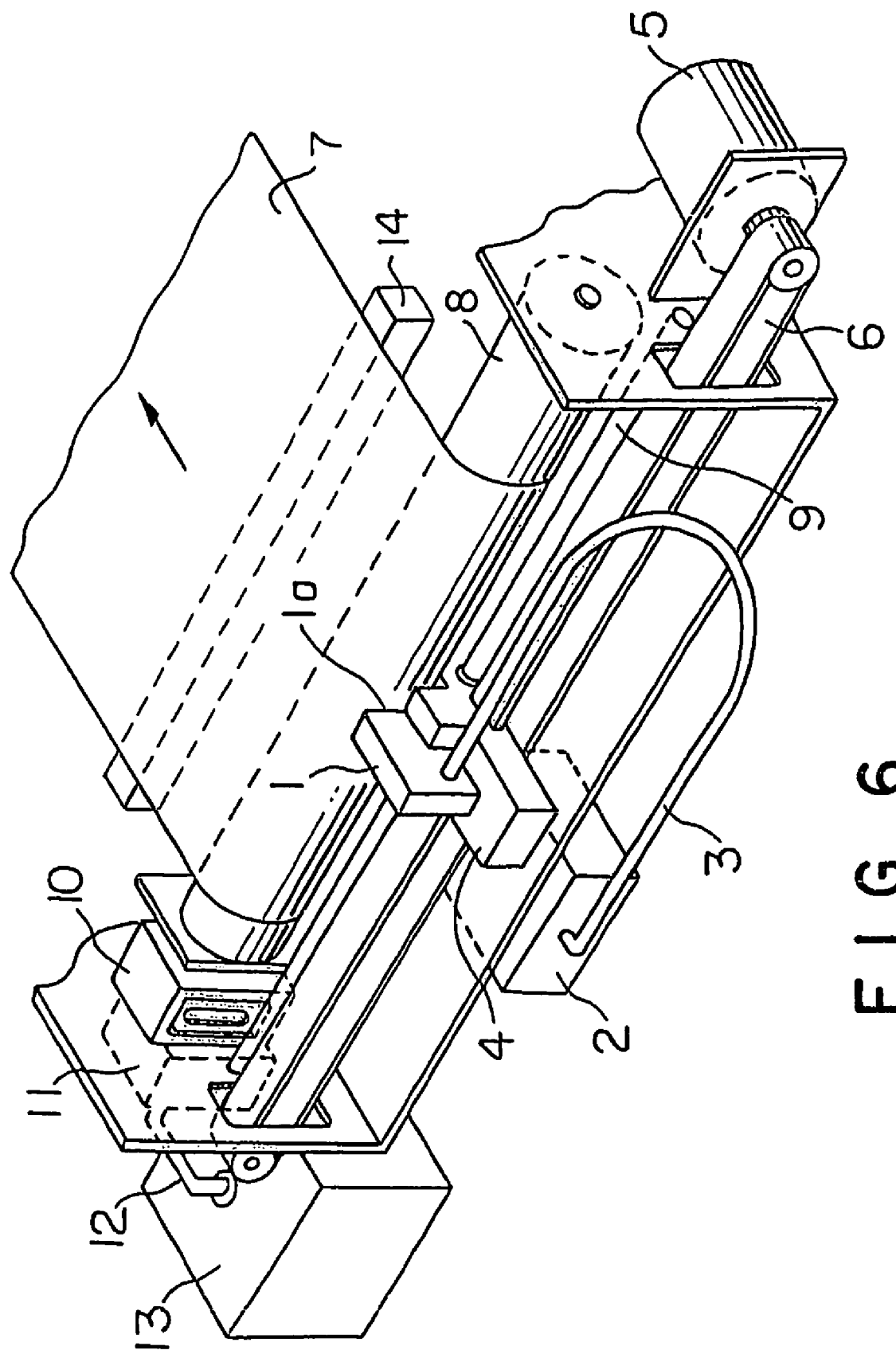
FIG. 6 is a schematic diagram of an ink jet recording apparatus, provided with means for heating a recording medium, which can realize the recording method according to the present invention.

A preferred embodiment of an ink jet recording apparatus wherein a heater for heating a printed recording medium is provided is shown in FIG. 6. The embodiment shown in FIG. 6 is the same as the embodiment shown in FIG. 1, except that a heater 14 is additionally provided. The heater 14 may be of a contact type wherein, in heating the recording medium, it is brought into contact with the recording medium. Alternatively, the heater 14 may be of a non-contact type where the recording medium is heated by applying infrared rays or the like or blowing hot air to the recording medium.

EXAMPLES

The following Examples and the like further illustrate the present invention. However, it should be noted that the present invention is not limited to these Examples and the like.

1. Preparation of Polymer Fine Particles

Polymer fine particles were prepared as follows. The glass transition temperature Tg of the polymer fine particle was measured according to JIS K 6900, and turbidity was measured with a turbidimeter (WATER-ANALYZER 2000, manufactured by Nippon Denshoku Industries Co., Ltd.) (cell width 10 mm).

(1) Emulsification-Type Emulsion

A reaction vessel equipped with a stirrer, a reflux condenser, a dropping device, and a thermometer was charged with 900 g of ion exchanged water and 3 g of sodium lauryl sulfate, and the temperature of the mixture was raised to 70° C. with stirring while replacing the air in the reaction vessel by nitrogen. While maintaining the internal temperature at 70° C., 4 g of potassium persulfate as a polymerization initiator was added to and dissolved therein. Thereafter, an emulsion which had been previously prepared by adding 20 g of acrylamide, 300 g of styrene, 640 g of butyl acrylate, and 30 g of methacrylic acid to 450 g of ion exchanged water and 3 g of sodium lauryl sulfate with stirring was continuously added dropwise to the reaction solution over a period of 4 hr. After the completion of the dropwise addition, the mixture was ripened for 3 hr. The emulsification-type emulsion thus obtained was cooled to room temperature and was then adjusted to a solid content of 40% and pH 8.0 by the addition of ion exchanged water and an aqueous sodium hydroxide solution.

The polymer fine particles in the emulsification-type emulsion had a glass transition temperature (Tg) of 15° C., an average particle diameter of 130 nm, a weight average molecular weight (Mw) of 500,000, a minimum film forming temperature (MFT) of 0° C., and a turbidity of not less than 30 mg/liter.

(2) Sol-Type Emulsion (Alkali Soluble Emulsion)

A reaction vessel equipped with a stirrer, a reflux condenser, a dropping device, and a thermometer was charged with 130 parts of ion exchanged water and 2 parts of potassium persulfate, and the temperature was raised to 80° C. A dispersion of a monomer mixture which had been previously prepared by adding 280 parts of ion exchanged water, 55 parts of ethyl acrylate, 37 parts of methyl acrylate, 6 parts of methacrylic acid, 3 parts of octyl thioglycolate as a molecular weight modifier, and 2.5 parts of polyvinyl alcohol with stirring was continuously added over a period of 4 hr for polymerization. After the completion of the continuous addition, a reaction was allowed to proceed at 80° C. for 30 min.

Next, a 10% aqueous sodium hydroxide solution in an amount equimolar, in terms of sodium hydroxide, with the charged methacrylic acid was added to the reactor. The mixture was further heat treated at 80° C. for one hr. A proper amount of ion exchanged water was then added to the reactor to prepare an alkali soluble emulsion having a solid content of 15%. This alkali soluble emulsion had an acid value of 40 and a pH value of 9.2.

The polymer fine particles in the alkali soluble emulsion had a glass transition temperature (Tg) (as measured according to JIS K 6900) of 25° C., an average particle diameter of not more than 50 nm, a weight average molecular weight (Mw) of 11,000, a minimum film forming temperature (MFT) of 15° C., and a turbidity of not more than 30 mg/liter.

(3) Sol-Type Emulsion (Sulfone Group-Containing Emulsion)

100 g of dioxane was placed in a glass reaction vessel. 11.8 g of sulfuric anhydride was added thereto while maintaining the internal temperature of the reaction vessel at 25° C., and the mixture was stirred for 2 hr to prepare a sulfuric anhydride-dioxane complex.

Next, the whole quantity of the complex was added to a THF solution of 100 g of a styrene/isoprene/styrene ternary block copolymer (weight ratio=10/80/10, Mw=100000) (concentration=15%) while maintaining the internal temperature at 25° C., and the mixture was further stirred for additional 2 hr to prepare a solution.

Separately, 1200 g of water, 7.1 g of sodium hydroxide, and 1 g of sodium dodecylbenzenesulfonate were placed in a flask, and the internal temperature of the flask was maintained at 40° C. The whole quantity of the above solution was added dropwise to the flask while maintaining the internal temperature at 40° C. over a period of one hr. After the completion of the dropwise addition, the mixture was stirred at 40° C. for 2 hr. The solvent was then removed by distillation under the reduced pressure while allowing water to remain unremoved to prepare a sulfone group-containing emulsion (concentration 15%). The solfonic acid content on a solid basis was 1.2 mmol/g.

The polymer fine particles in the sulfone group-containing emulsion had a glass transition temperature (Tg) of 25° C., an average particle diameter of not more than 50 nm, a weight average molecular weight (Mw) of 10,000, a minimum film forming temperature (MFT) of 15° C. and a turbidity of not more than 30 mg/liter.

2. Preparation of Liquid Composition

In the Examples, the content of the modified polyallylamine and the content of the polyethyleneimine or its derivative and polymer fine particles (emulsion) are on a solid basis.

(1) Examples According to First Aspect of Invention

Liquid Composition A1

Liquid composition A1 was prepared using the polymer fine particles prepared above according to the following formulation.

| | |
|---|---|
| Dimethylpolyallylamine (molecular weight 10,000/dimetyl modification rate: 50 mol %) | 5.0 wt % |
| Sulfone group-containing emulsion | 2.0 wt % |
| Glycerin | 25.0 wt % |
| Triethylene glycol monobutyl ether | 3.0 wt % |
| Olfine E1010 | 0.3 wt % |
| Water | Balance |

Liquid Composition A2

Liquid composition A2 was prepared in the same manner as in liquid composition A1, except that dimethylpolyamine (molecular weight 10,000/dimetyl modification rate: 100 mol %) was used instead of dimethylpolyallylamine (molecular weight 10,000/dimetyl modification rate: 50 mol %).

Liquid Composition A3

Liquid composition A3 was prepared in the same manner as in liquid composition A1, except that dimethylpolyamine (molecular weight 2,000/dimetyl modification rate: 50 mol %) was used instead of dimethylpolyallylamine (molecular weight 10,000/dimetyl modification rate: 50 mol %).

Liquid Composition A4

Liquid composition A4 was prepared in the same manner as in liquid composition A1, except that dimethylpolyamine (molecular weight 2,000/dimetyl modification rate: 100 mol %) was used instead of dimethylpolyallylamine (molecular weight 10,000/dimetyl modification rate: 50 mol %).

Liquid Composition A5

Liquid composition A5 was prepared in the same manner as in liquid composition A4, except that the emulsification-type emulsion was used instead of the sulfone group-containing emulsion.

Liquid Composition A6

Liquid composition A6 was prepared in the same manner as in liquid composition A4, except that the alkali soluble emulsion was used instead of the sulfone group-containing emulsion.

Liquid Composition A7

Liquid composition A7 was prepared in the same manner as in liquid composition A4, except that AQACER 593, a modified polypropylene emulsion, was used instead of the sulfone group-containing emulsion.

Liquid Composition A8

Liquid composition A8 was prepared in the same manner as in liquid composition A4, except that the sulfone group-containing emulsion was not added.

Liquid Composition A9

Liquid composition A9 was prepared according to the following formulation. Specifically, the liquid composition contained no emulsion and, instead of dimethylpolyallylamine, contained polyethyleneimine, a cationic resin.

| | |
|---|---|
| Polyethyleneimine (molecular weight 1,000) | 5.0 wt % |
| Glycerin | 25.0 wt % |
| Triethylene glycol monobutyl ether | 3.0 wt % |
| Olfine E1010 | 0.3 wt % |
| Water | Balance |

Liquid Composition A10

Liquid composition A10 was prepared according to the following formulation. Specifically, the liquid composition contained neither dimethylpolyallylamine nor the emulsion.

| | |
|---|---|
| Glycerin | 30.0 wt % |
| Triethylene glycol monobutyl ether | 3.0 wt % |
| Olfine E1010 | 0.3 wt % |
| Water | Balance |

The surface tension of liquid compositions A10 to A10 was measured with CBVP-Z, manufactured by Kyowa Interface Science Co., LTD. As a result, for all the liquid compositions, the surface tension was 25 to 35 dyn/cm.

The formulations of liquid compositions A1 to A10 are shown in Table 1.

TABLE 1

| | Modification | | Liquid composition | | | | | | | | | |
|---|---|---|---|---|---|---|---|---|---|---|---|---|
| | Mw | rate | A1 | A2 | A3 | A4 | A5 | A6 | A7 | A8 | A9 | A10 |
| PAA | 10,000 | 50% | 5.0 | — | — | — | — | — | — | — | — | — |
| | 10,000 | 100% | — | 5.0 | — | — | — | — | — | — | — | — |
| | 2,000 | 50% | — | — | 5.0 | — | — | — | — | — | — | — |
| | 2,000 | 100% | — | — | — | 5.0 | 5.0 | 5.0 | 5.0 | 5.0 | — | — |
| PEI | | | — | — | — | — | — | — | — | — | 5.0 | — |
| Emulsification-type emulsion | | | — | — | — | — | 2.0 | — | — | — | — | — |
| Alkali soluble emulsion | | | — | — | — | — | — | 2.0 | — | — | — | — |
| Sulfone group-containing emulsion | | | 2.0 | 2.0 | 2.0 | 2.0 | — | — | — | — | — | — |
| AQUACER 593 | | | — | — | — | — | — | — | 2.0 | — | — | — |
| Gly | | | 25 | 25 | 25 | 25 | 25 | 25 | 25 | 25 | 25 | 25 |
| TEGmBE | | | 3 | 3 | 3 | 3 | 3 | 3 | 3 | 3 | 3 | 3 |
| Olfine E1010 | | | 0.3 | 0.3 | 0.3 | 0.3 | 0.3 | 0.3 | 0.3 | 0.3 | 0.3 | 0.3 |
| Water | | | Balance | Balance | Balance | Balance | Balance | Balance | Balance | Balance | Balance | Balance |
| Total | | | 100 | 100 | 100 | 100 | 100 | 100 | 100 | 100 | 100 | 100 |

In the table,
PAA: polyallylamine,
PEI: polyethyleneimine,
Gly: glycerin,
TEGmBE: triethylene glycol monobutyl ether, and
AQUACER 593: tradename of modified polypropylene emulsion.

Liquid Composition B1

Liquid composition B1 was prepared using the polymer fine particles prepared above according to the following formulation.

| | |
|---|---|
| Polyallylamine (molecular weight 10,000) | 0.5 wt % |
| Sulfone group-containing emulsion | 2.0 wt % |
| Glycerin | 25.0 wt % |
| Triethylene glycol monobutyl ether | 3.0 wt % |
| Olfine E1010 | 0.3 wt % |
| Water | Balance |

Liquid Composition B2

Liquid composition B2 was prepared in the same manner as in liquid composition B1, except that polyamine (molecular weight 2,000) was used instead of polyallylamine (molecular weight 10,000) and the amount of glycerin added was changed from 250% by weight to 200% by weight.

Liquid Composition B3

Liquid composition B3 was prepared according to the following formulation.

| | |
|---|---|
| Polyallylamine (molecular weight 10,000) | 4.0 wt % |
| Polyallylamine (molecular weight 2,000) | 1.0 wt % |
| Sulfone group-containing emulsion | 2.0 wt % |
| Glycerin | 25.0 wt % |
| Triethylene glycol monobutyl ether | 3.0 wt % |
| Olfine E1010 | 0.3 wt % |
| Water | Balance |

Liquid Composition B4

Liquid composition B4 was prepared according to the following formulation.

| | |
|---|---|
| Polyallylamine (molecular weight 10,000) | 1.0 wt % |
| Polyallylamine (molecular weight 2,000) | 2.0 wt % |
| Sulfone group-containing emulsion | 2.0 wt % |
| Glycerin | 25.0 wt % |
| Triethylene glycol monobutyl ether | 3.0 wt % |
| Olfine E1010 | 0.3 wt % |
| Water | Balance |

Liquid Composition B5

Liquid composition B5 was prepared in the same manner as in liquid composition B4, except that the emulsification-type emulsion was used instead of the sulfone group-containing emulsion.

Liquid Composition B6

Liquid composition B6 was prepared in the same manner as in liquid composition B4, except that the alkali soluble emulsion was used instead of the sulfone group-containing emulsion.

Liquid Composition B7

Liquid composition B7 was prepared in the same manner as in liquid composition B4, except that AQACER 593, a modified polypropylene emulsion, was used instead of the sulfone group-containing emulsion.

Liquid Composition B8

Liquid composition B8 was prepared in the same manner as in liquid composition B4, except that the sulfone group-containing emulsion was not added.

Liquid Composition B9

Liquid composition B9 was prepared according to the following formulation. Specifically, the liquid composition contained polyethyleneimine instead of polyallylamine.

| | |
|---|---|
| Polyethyleneimine (molecular weight 1,000) | 5.0 wt % |
| Glycerin | 25.0 wt % |
| Triethylene glycol monobutyl ether | 3.0 wt % |
| Olfine E1010 | 0.3 wt % |
| Water | Balance |

Liquid Composition B10

Liquid composition B10 was prepared according to the following formulation. Specifically, the liquid composition contained no polyallylamine.

| | |
|---|---|
| Glycerin | 30.0 wt % |
| Triethylene glycol monobutyl ether | 3.0 wt % |
| Olfine E1010 | 0.3 wt % |
| Water | Balance |

The surface tension of liquid compositions B1 to B10 was measured with CBVP-Z, manufactured by Kyowa Interface Science Co., LTD. As a result, for all the liquid compositions, the surface tension was 25 to 35 dyn/cm.

The formulations of liquid compositions B1 to B10 are shown in Table 2.

TABLE 2

| | | B1 | B2 | B3 | B4 | B5 | B6 | B7 | B8 | B9 | B10 |
|---|---|---|---|---|---|---|---|---|---|---|---|
| PAA | Mw: 10,000 | 0.5 | — | 4.0 | 1.0 | 1.0 | 1.0 | 1.0 | 1.0 | — | — |
| | Mw: 2,000 | — | 0.5 | 1.0 | 4.0 | 4.0 | 4.0 | 4.0 | 4.0 | — | — |
| PEI | | — | — | — | — | — | — | — | — | 5.0 | — |
| Emulsification-type emulsion | | — | — | — | — | 2.0 | — | — | — | — | — |
| Alkali soluble emulsion | | — | — | — | — | — | 2.0 | — | — | — | — |
| Sulfone group-containing emulsion | | 2.0 | 2.0 | 2.0 | 2.0 | — | — | — | — | — | — |
| AQUACER 593 | | — | — | — | — | — | — | 2.0 | — | — | — |
| Gly | | 25 | 25 | 25 | 25 | 25 | 25 | 25 | 25 | 25 | 25 |
| TEGmBE | | 3 | 3 | 3 | 3 | 3 | 3 | 3 | 3 | 3 | 3 |
| Olfine E1010 | | 0.3 | 0.3 | 0.3 | 0.3 | 0.3 | 0.3 | 0.3 | 0.3 | 0.3 | 0.3 |
| Water | | Balance | Balance | Balance | Balance | Balance | Balance | Balance | Balance | Balance | Balance |
| Total | | 100 | 100 | 100 | 100 | 100 | 100 | 100 | 100 | 100 | 100 |

In the table,
PAA: polyallylamine,
PEI: polyethyleneimine,
Gly: glycerin,
TEGmBE: triethylene glycol monobutyl ether, and
AQUACER 593: tradename of modified polypropylene emulsion.

(2) Examples According to Second Aspect of Invention

Liquid Composition C1

Liquid composition C1 was prepared using the polymer fine particles prepared above according to the following formulation.

| | |
|---|---|
| Polyethyleneimine (molecular weight 1,000) | 0.25 wt % |
| Polyallylamine (molecular weight 5,000) | 0.25 wt % |
| Sulfone group-containing emulsion | 2.0 wt % |
| Glycerin | 25.0 wt % |
| Triethylene glycol monobutyl ether | 3.0 wt % |
| Olfine E1010 | 0.3 wt % |
| Water | Balance |

Liquid Composition C2

Liquid composition C2 was prepared in the same manner as in liquid composition C1, except that polyallylamine (molecular weight 1,000) was used instead of polyallylamine (molecular weight 5,000).

Liquid Composition C3

Liquid composition C3 was prepared in the same manner as in liquid composition C2, except that the amount of polyallylamine (molecular weight 1,000) added was changed from 0.250% by weight to 4.750% by weight and the amount of glycerin added was changed from 25.00/o by weight to 20.00/o by weight.

Liquid Composition C4

Liquid composition C4 was prepared in the same manner as in liquid composition C3, except that the emulsification-type emulsion was used instead of the sulfone group-containing emulsion.

Liquid Composition C5

Liquid composition C5 was prepared in the same manner as in liquid composition C3, except that the alkali soluble emulsion was used instead of the sulfone group-containing emulsion.

Liquid Composition C6

Liquid composition C6 was prepared in the same manner as in liquid composition C3, except that AQACER 593, a modified polypropylene emulsion, was used instead of the sulfone group-containing emulsion.

Liquid Composition C7

Liquid composition C7 was prepared according to the following formulation.

| | |
|---|---|
| Polyethyleneimine (molecular weight 5,000) | 0.25 wt % |
| Polyallylamine (molecular weight 2,000) | 4.75 wt % |
| Glycerin | 25.0 wt % |
| Triethylene glycol monobutyl ether | 3.0 wt % |
| Olfine E1010 | 0.3 wt % |
| Water | Balance |

Liquid Composition C8

Liquid composition C8 was prepared according to the following formulation. Specifically, the liquid composition contained no polyallylamine.

| | |
|---|---|
| Polyethyleneimine (molecular weight 1,000) | 5.0 wt % |
| Glycerin | 25.0 wt % |
| Triethylene glycol monobutyl ether | 3.0 wt % |
| Olfine E1010 | 0.3 wt % |
| Water | Balance |

Liquid Composition C9

Liquid composition C9 was prepared according to the following formulation. Specifically, the liquid composition

| | |
|---|---|
| Glycerin | 30.0 wt % |
| Triethylene glycol monobutyl ether | 3.0 wt % |
| Olfine E1010 | 0.3 wt % |
| Water | Balance |

The surface tension of liquid compositions C1 to C9 was measured with CBVP-Z, manufactured by Kyowa Interface Science Co., LTD. As a result, for all the liquid compositions, the surface tension was 25 to 35 dyn/cm.

The formulations of liquid compositions C1 to C9 are shown in Table 3.

TABLE 3

| | | Liquid composition | | | | | | | | |
|---|---|---|---|---|---|---|---|---|---|---|
| | | C1 | C2 | C3 | C4 | C5 | C6 | C7 | C8 | C9 |
| PEI | MW: 1,000 | 0.25 | 0.25 | 0.25 | 0.25 | 0.25 | 0.25 | — | 5.00 | — |
| | MW: 5,000 | — | — | — | — | — | — | 0.25 | — | — |
| PAA | MW: 5,000 | 0.25 | — | — | — | — | — | - | — | — |
| | MW: 2,000 | — | — | — | — | — | — | 4.75 | — | — |
| | MW: 1,000 | — | 0.25 | 4.75 | 4.75 | 4.75 | 4.75 | — | — | — |
| Emulsification-type emulsion | | — | — | — | 2.0 | — | — | — | — | — |
| Alkali soluble emulsion | | — | — | — | — | 2.0 | — | — | — | — |
| Sulfone group-containing emulsion | | 2.0 | 2.0 | 2.0 | — | — | — | — | — | — |
| AQACER 593 | | — | — | — | — | — | 2.0 | — | — | — |
| Gly | | 25 | 25 | 20 | 20 | 20 | 20 | 25 | 25 | 30 |
| TEGmBE | | 3 | 3 | 3 | 3 | 3 | 3 | 3 | 3 | 3 |
| Olfine E1010 | | 0.3 | 0.3 | 0.3 | 0.3 | 0.3 | 0.3 | 0.3 | 0.3 | 0.3 |
| Water | | Balance | Balance | Balance | Balance | Balance | Balance | Balance | Balance | Balance |
| Total | | 100 | 100 | 100 | 100 | 100 | 100 | 100 | 100 | 100 |

In the table,
PAA: polyallylamine,
PEI: polyethyleneimine,
Gly: polyethyleneimine,
Gly: glycerin,
TEGmBE: triethylene glycol monobutyl ether, and
AQACER 593: tradename of modified polypropylene emulsion.

Preparation of Inks

Ink compositions having formulations shown in Table 4 were prepared according to the following procedure. A pigment and a dispersion (styrene-acrylic acid copolymer) were first mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed, other additions were added, and the mixture was stirred at room temperature for 20 min and was filtered through a 5-μm membrane filter to prepare a pigment-based ink.

TABLE 4

| | Ink composition | | | |
|---|---|---|---|---|
| | Yellow | Magenta | Cyan | Black |
| C.I. Pigment Yellow 74 | 3.0 | — | — | — |
| C.I. Pigment Violet 19 | — | 1.5 | — | — |
| C.I. Pigment Blue 15:3 | — | — | 1.5 | — |
| Carbon black | — | — | — | 2.0 |
| Styrene-acrylic acid copolymer | 1.0 | 0.5 | 0.5 | 2.0 |
| BYK-347 | 0.5 | 0.5 | 0.5 | 0.5 |
| Gly | 15 | 15 | 15 | 20 |

TABLE 4-continued

| | Ink composition | | | |
|---|---|---|---|---|
| | Yellow | Magenta | Cyan | Black |
| TEGmBE | 5 | 5 | 5 | 10 |
| 1,2-HD | 10 | 10 | 10 | 5 |
| TEA | 0.9 | 0.9 | 0.9 | 0.9 |
| Water | Balance | Balance | Balance | Balance |
| Total | 100 | 100 | 100 | 100 |

In the table,
TEGmBE: triethylene glycol monobutyl ether,
1,2-HD: 1,2-hexanediol,
BYK-347: tradename of polysiloxane compound,
Gly: glycol, and
TEA: triethanolamine.

Evaluation Test

Evaluation 1: Gloss

Any of liquid compositions A1 to A10, B1 to B10, and C1 to C9 and an ink set were loaded into an ink jet printer (MC-2000, manufactured by Seiko Epson Corporation), and printing was carried out on ink jet specialty paper (PM Photo Paper, manufactured by Seiko Epson Corporation) at 720× 720 dpi.

The print pattern was regulated so that the duty of a single color and the total duty of a mixed color of two or more colors of color and black inks was 0% (nonprinted part), 10%, 15%, 40%, and 100%.

Further, the liquid composition was printed on a part where the total duty of the ink compositions was not more than 20% in such a manner that the grand total of the total duty of the ink compositions and the duty of the liquid composition was uniformly 20% duty.

The term "duty" is a value calculated by the following equation.

Duty(%)=Number of actually printed dots/(longitudinal resolution×lateral resolution)×100 wherein "number of actually printed dots" is the number of actually printed dots per unit area, and "longitudinal resolution" and "lateral resolution" each are resolution per unit area. 100% duty refers to the maximum weight of ink of a single color based on the pixel.

1-1 Evaluation of Gloss by Measurement

For each recorded matter, the gloss was measured and evaluated as follows. The maximum value of the gloss was measured with "GP-200" manufactured by MURAKAMI COLOR RESEARCH LABORATORY under conditions of 12 V and 50 W, incoming beam drawing diameter 1 mm, reflected light drawing diameter 1.5 mm, ND 10 filter, angle of incidence 45 degrees, flapping angle 0 (zero) degree, and standard mirror plate 42.5. The measured values were evaluated according to the following criteria. The higher the maximum value of the gloss, the higher the level of gloss imparting properties.

The evaluation criteria were as follows.
S: A maximum gloss of not less than 50
AA: A maximum gloss of not less than 45
A: A maximum gloss of not less than 40
B: A maximum gloss of not less than 30 and less than 40
C: A maximum gloss of not less than 20 and less than 30
D: A maximum gloss of not less than 10 and less than 20
E: A maximum gloss of less than 10

The results of evaluation were as shown in the table below.

1-2 Evaluation of Gloss by Visual Inspection

A person image specified in ISO 400 was printed in the same printing method as used above, and the state of gloss in the recording medium was visually evaluated.

Evaluation criteria were as follows.

AA: An even and high level of glossy impression was provided.

A: Although a substantially even level of glossy impression was provided, a lower level of gloss was partially observed and provided somewhat uncomfortable feeling.

B: Gloss was not even, and there was uncomfortable feeling.

The results of evaluation were as shown in Table 5 below.

It was found that the gloss was high in parts where the total duty of the ink composition is not more than 20% and was substantially equal to or superior to the gloss of parts where the total duty of the ink composition was not less than 20%.

TABLE 5

|  |  | Evaluation 1-1 (duty) |  |  |  |  | Evaluation |
|---|---|---|---|---|---|---|---|
|  | Liquid composition | 0% | 10% | 15% | 40% | 100% | 1-2 |
| Ex. A1 | Liquid composition A1 | AA | AA | A | A | A | — |
| Ex. A2 | Liquid composition A2 | AA | AA | A | A | A | — |
| Ex. A3 | Liquid composition A3 | AA | AA | A | A | A | — |
| Ex. A4 | Liquid composition A4 | AA | AA | A | A | A | — |
| Ex. A5 | Liquid composition A5 | AA | AA | A | A | A | — |
| Ex. A6 | Liquid composition A6 | AA | AA | A | A | A | — |
| Ex. A7 | Liquid composition A7 | AA | AA | A | A | A | — |
| Ex. A8 | Liquid composition A8 | C | A | A | A | A | — |
| Comp. Ex. A1 | Liquid composition A9 | C | A | A | A | A | — |
| Comp. Ex. A2 | (None) | E | B | B | A | A | — |
| Ex. B1 | Liquid composition B1 | AA | AA | A | A | A | — |
| Ex. B2 | Liquid composition B2 | AA | AA | A | A | A | — |
| Ex. B3 | Liquid composition B3 | AA | AA | A | A | A | — |
| Ex. B4 | Liquid composition B4 | AA | AA | A | A | A | — |
| Ex. B5 | Liquid composition B5 | AA | AA | A | A | A | — |
| Ex. B6 | Liquid composition B6 | AA | AA | A | A | A | — |
| Ex. B7 | Liquid composition B7 | AA | AA | A | A | A | — |
| Comp. Ex. B1 | Liquid composition B8 | C | A | A | A | A | — |
| Comp. Ex. B2 | Liquid composition B9 | C | A | A | A | A | — |
| Comp. Ex. B3 | (None) | E | B | B | A | A | — |
| Ex. C1 | Liquid composition C1 | AA | AA | A | A | A | AA |
| Ex. C2 | Liquid composition C2 | AA | AA | A | A | A | AA |
| Ex. C3 | Liquid composition C3 | AA | AA | A | A | A | AA |
| Ex. C4 | Liquid composition C4 | AA | AA | A | A | A | AA |
| Ex. C5 | Liquid composition C5 | AA | AA | A | A | A | AA |
| Ex. C6 | Liquid composition C6 | AA | AA | A | A | A | AA |
| Ex. C7 | Liquid composition C7 | C | A | A | A | A | A |
| Comp. Ex. C1 | Liquid composition C8 | C | A | A | A | A | A |
| Comp. Ex. C2 | Liquid composition C9 | E | B | B | A | A | B |

Evaluation 2: Color Development Test

Any of liquid compositions A1 to A10, B1 to B10, and C1 to C9 and an ink set were loaded into an ink jet printer (MC-2000, manufactured by Seiko Epson Corporation), and printing was carried out on plain paper (Xerox 4024) at 720× 720 dpi. In this case, the ink composition was printed at 70% duty, and, substantially simultaneously with the printing of the ink composition, the liquid composition was printed at 10% duty.

The optical density of the recorded matter was measured. The optical density was measured with Gretag Macbeth SPM 50, manufactured by Gretag Macbeth under conditions of D50 light source, no filter, and view angle 2 degrees.

Evaluation criteria were as follows.

Evaluation Criteria

AA: Uncolored part could not be visually confirmed without difficulties, and not less than 0.06 increase in OD value was observed over the case where the liquid composition was not printed.

A: Uncolored part could not be visually confirmed without difficulties, and not less than 0.03 increase in OD value was observed over the case where the liquid composition was not printed.

B: Uncolored part could easily be visually confirmed, and the increase in OD value over the case where the liquid composition was not printed was not 0.03 or more.

The results were as shown in Table 6 below.

Evaluation 3: Suitability for Waste Liquid Treatment

Any of liquid compositions A1 to A10, B1 to B10, and C1 to C9 and an ink composition were loaded into an ink jet printer (MC-2000, manufactured by Seiko Epson Corporation). Thereafter, cleaning of the recording head (a cleaning button of the printer is depressed once) and printing of a nozzle check pattern were repeated. This test operation was carried out ten times. In this case, whether or not the nozzle check pattern was normally printed was evaluated, and the state of the waste liquid within the cap was observed. For liquid compositions in which, in all of the ten test operations, the nozzle check pattern was normally printed, the test operation was further repeated 90 times to evaluate whether or not the check pattern was normally printed and to observe the state of the waste liquid within the cap. For liquid compositions in which, in all of the 90 test operations, the nozzle check pattern was normally printed, the test operation was further repeated 100 times under an environment of 40° C. for evaluation in the same manner as described above.

The results were evaluated according to the following criteria.

S: In all of 100 test operations under an environment of 40° C., the check pattern could be normally printed, and, further, the residence of the waste liquid within the cap was not observed.

AA: In all of 100 test operations under an environment of 20° C., the check pattern could be normally printed, and, further, the residence of the waste liquid within the cap was not observed.

A: In all of 10 test operations under an environment of 20° C., the check pattern could be normally printed, and, further, the residence of the waste liquid within the cap was not observed.

B: In all of 10 test operations under an environment of 20° C., the check pattern could be normally printed, although the residence of the waste liquid within the cap was somewhat observed.

C: In 10 test operations under an environment of 20° C., the check pattern sometimes could not be normally printed, and the residence of the waste liquid within the cap was observed.

The results were as shown in Table 6.

Evaluation 4: Suitability for Waste Liquid Treatment

Evaluation 4 was carried out in the same manner as in evaluation 3, except that the ink jet printer had a cap provided with a nonwoven fabric.

The results were as shown in Table 6.

Evaluation 5: Storage Stability

Any of liquid compositions A1 to A10, and B1 to B10, and an ink composition were loaded into an ink jet printer (MC-2000, manufactured by Seiko Epson Corporation), and printing was carried out on ink jet specialty paper (PM Photo Paper, manufactured by Seiko Epson Corporation) at 720× 720 dpi and duty 40%. The print samples were allowed to stand for one week in a thermo-hygrostat of temperature 80° C. and humidity 50%. After standing, for each print sample, the value of CIE-Lab was measured with Gretag Macbeth SPM 50, manufactured by Gretag Macbeth under conditions of D50 light source, no filter, and view angle 2 degrees. Color difference ΔE was determined according to the following equation based on the measured value and the value of CIE-Lab which had been measured before standing.

$$\Delta E=[(L^*(\text{before standing})-L^*(\text{after standing}))^2+(a^*(\text{before standing})-a^*(\text{after standing}))^2+(b^*(\text{before standing})-b^*(\text{after standing}))^2]^{1/2}$$

The results were evaluated according to the following evaluation criteria.

Evaluation Criteria
A: An ΔE value of less than 2
B: An ΔE value of not less than 2
The results were as shown in Table 6.

TABLE 6

| | Liquid composition | Evaluation 2 | Evaluation 3 | Evaluation 4 | Evaluation 5 |
|---|---|---|---|---|---|
| Ex. A1 | Liquid composition A1 | AA | A | B | A |
| Ex. A2 | Liquid composition A2 | AA | AA | B | A |
| Ex. A3 | Liquid composition A3 | AA | A | A | A |
| Ex. A4 | Liquid composition A4 | AA | AA | A | A |
| Ex. A5 | Liquid composition A5 | AA | AA | A | A |
| Ex. A6 | Liquid composition A6 | AA | AA | A | A |
| Ex. A7 | Liquid composition A7 | AA | AA | A | A |
| Ex. A8 | Liquid composition A8 | AA | AA | A | A |
| Comp. Ex. A1 | Liquid composition A9 | A | B | C | B |
| Comp. Ex. A2 | Liquid composition A10 | B | A | A | — |
| Ex. B1 | Liquid composition B1 | A | A | B | A |
| Ex. B2 | Liquid composition B2 | AA | A | B | A |
| Ex. B3 | Liquid composition B3 | AA | A | B | A |
| Ex. B4 | Liquid composition B4 | AA | A | B | A |
| Ex. B5 | Liquid composition B5 | AA | A | B | A |
| Ex. B6 | Liquid composition B6 | AA | A | B | A |
| Ex. B7 | Liquid composition B7 | AA | A | B | A |
| Comp. Ex B1 | Liquid composition B8 | AA | A | A | A |
| Comp. Ex B2 | Liquid composition B9 | A | B | C | B |
| Comp. Ex B3 | Liquid composition B10 | B | A | A | — |
| Ex. C1 | Liquid composition C1 | A | A | B | — |
| Ex. C2 | Liquid composition C2 | A | A | A | — |
| Ex. C3 | Liquid composition C3 | AA | A | A | — |
| Ex. C4 | Liquid composition C4 | AA | A | A | — |
| Ex. C5 | Liquid composition C5 | AA | A | A | — |
| Ex. C6 | Liquid composition C6 | AA | A | A | — |
| Ex. C7 | Liquid composition C7 | AA | A | A | — |
| Comp. Ex. C1 | Liquid composition C8 | A | A | C | — |
| Comp. Ex. C2 | Liquid composition C9 | B | A | A | — |

(3) Embodiments of Invention According to Third Aspect

Production of Modified Polyallylamine

Modified polyallylamines of Production Examples 1 to 13 were produced as follows. In the following description, polyallylamine is sometimes referred to as "PAA," and allylamine is sometimes referred to as "AA." Further, "%" is by weight unless otherwise specified.

Production Example 1

Production of Modified PAA-1 (Copolymer of N,N-dimethyl AA with AA (5/5))

A 2000 ml four-necked separable flask equipped with a stirrer, a Dimroth reflux device, and a thermometer was charged with 431.24 g of a 63.45% aqueous N,N-dimethylallylamine hydrochloride solution and 362.25 g of a 58.11% aqueous monoallylamine hydrochloride solution. The aqueous monomer solution was heated to 60° C., 146.45 g of 2,2'-azobis(2-amidinopropane) dihydrochloride was added as a radical initiator, and the mixture was polymerized for 120 hr.

After the completion of the polymerization, 332.78 g of a 50% aqueous sodium hydroxide solution was added dropwise thereto under ice cooling to neutralize hydrochloric acid. After the completion of the neutralization, the monomer remaining unreacted was removed by distillation under the reduced pressure (80 mmHg) at 50° C.

The solution thus obtained was electrodialyzed and desalted to give 1914.97 g of an aqueous solution (concentration=14.35%) of a free-type copolymer of N,N-dimethylallylamine with allylamine (comonomer ratio=5:5).

A part of the aqueous copolymer solution was brought to a hydrochloride which was reprecipitated from an acetone solvent to give a hydrochloride of the copolymer. The results of the elementary analysis were C=44.80, H=9.12, and N=12.58 and were in agreement with calculated values C=44.66, H=9.37, and N=13.02.

Production Example 2

Production of Modified PAA-2 (Copolymer of N,N-dimethyl AA with Carbamoylated AA (5/5))

A 1000 ml four-necked separable flask equipped with a stirrer, a Dimroth reflux device, and a thermometer was charged with 421.29 g of the aqueous solution of free-type copolymer of N,N-dimethylallylamine with allylamine (concentration: 14.35%) produced in Production Example 1, and 88.65 g of hydrochloric acid (concentration: 35%) was added dropwise thereto under ice cooling. Subsequently, the mixture was heated to 50° C., 368.37 g of a 7.5% aqueous sodium cyanate solution was added dropwise thereto, and a reaction was allowed to proceed for 24 hr.

After the completion of the reaction, 34.00 g of a 50% sodium hydroxide solution was added dropwise under ice cooling to neutralize hydrochloric acid remaining unreacted.

The solution thus obtained was electrodialyzed and desalted to give 729.61 g (yield 95%) of an aqueous solution (concentration 10.30%) of a free-type copolymer of N,N-dimethylallylamine with carbamoylated allylamine (comonomer ratio=5:5). This copolymer had a weight average molecular weight of 1200.

This copolymer was concentrated to give a solid. The solubility of this solid at 10% in various solvents was examined. As a result, it was found that this polymer was insoluble in acetone and acetonitrile but was soluble in methanol, ethanol, isopropanol, DMSO, and DMF, indicating that, unlike the allylamine polymer, the copolymer of the present invention was also soluble in organic solvents.

A part of the aqueous copolymer solution was brought to a hydrochloride which was reprecipitated from an acetone solvent to give a hydrochloride of the copolymer, indicating that the modified polyallylamine according to the present invention can be brought to a cationic polymer.

The results of the elementary analysis were C=48.96, H=8.58, and N=18.64 and were in agreement with calculated values C=48.75, H=9.09, N=18.95. The molar fraction of carbamoylation was calculated by neutralization titration of the hydrochloride of the copolymer and was found to be 47.890%, that is, was in substantial agreement with the results of the elementary analysis.

Production Example 3a

Production of Modified PAA-3a (Copolymer of N,N-dimethyl AA with Methoxycarbonylated AA (5/5))

A 1000 ml four-necked separable flask equipped with a stirrer, a Dimroth reflux device, and a thermometer was charged with 421.29 g of the aqueous solution of free-type copolymer of N,N-dimethylallylamine with allylamine (concentration: 14.35%) produced in Production Example 1, and the mixture was heated to 50° C. 38.67 g of dimethyl carbonate having a purity of 99% was added dropwise thereto, and a reaction was allowed to proceed for 24 hr.

After the completion of the reaction, the by-produced methanol was removed by distillation under the reduced pressure (80 mmHg) at 50° C. to give 383.85 g (yield 99%) of an aqueous solution (concentration: 21.98% by weight) of a free-type copolymer of N,N-dimethylallylamine with methoxycarbonylated allylamine (comonomer ratio=5:5). This copolymer had a weight average molecular weight of 1300.

A part of the aqueous copolymer solution was brought to a hydrochloride which was reprecipitated from an acetone solvent to give a hydrochloride of the copolymer. The results of the elementary analysis were C=50.31, H=8.93, and N=11.37 and were in agreement with calculated values C=50.73, H=8.94, and N=11.83. The molar fraction of methoxycarbonylation was calculated by neutralization titration of the hydrochloride of the copolymer and was found to be 49.46%, that is, was in substantial agreement with the results of the elementary analysis.

Production Example 3b

Production of Modified PAA-3b (Copolymer of N,N-dimethyl AA with Methoxycarbonylated AA (3/7))

1978.93 g of an aqueous solution (concentration: 14.27% by weight) of a free-type copolymer of N,N-dimethylallylamine with allylamine (comonomer ratio=3:7) was prepared in the same manner as in Production Example 1, except that the amount of the aqueous solution (concentration: 63.45% by weight) of N,N-dimethylallylamine hydrochloride was changed to 258.75 g, and the amount of the aqueous solution (concentration: 58.11% by weight) of monoallylamine hydrochloride was changed to 507.15 g.

Next, 406.02 g (yield: 1000/%) of an aqueous solution (concentration: 22.120% by weight) of a free-type copolymer of N,N-dimethylallylamine with methoxycarbonylated allylamine (comonomer ratio=3:7) was prepared in the same manner as in Production Example 3a, except that 390.23 g of the aqueous solution (concentration: 14.27% by weight) of the free-type copolymer of N,N-dimethylallylamine with allylamine (comonomer ratio=3:7) and 54.14 g of dimethyl carbonate prepared above were used instead of the aqueous solution of the free-type copolymer of N,N-dimethylallylamine with allylamine prepared in Production Example 1. This copolymer had a weight average molecular weight of 1300.

Production Example 3c

Production of Modified PAA-3c (Copolymer of N,N-dimethyl AA with Methoxycarbonylated AA (7/3))

2045.55 g of an aqueous solution (concentration: 14.20% by weight) of a free-type copolymer of N,N-dimethylallylamine with allylamine (comonomer ratio=7:3) was prepared in the same manner as in Production Example 1, except that the amount of the aqueous solution (concentration: 63.45% by weight) of N,N-dimethylallylamine hydrochloride was changed to 603.74 g, and the amount of the aqueous solution (concentration: 58.11% by weight) of monoallylamine hydrochloride was changed to 217.35 g.

Next, 359.63 g (yield: 99%) of an aqueous solution (concentration: 15.08% by weight) of a free-type copolymer of N,N-dimethylallylamine with methoxycarbonylated allylamine (comonomer ratio=7:3) was prepared in the same manner as in Production Example 3a, except that 459.32 g of the aqueous solution (concentration: 14.20% by weight) of the free-type copolymer of N,N-dimethylallylamine with allylamine and 22.08 g of dimethyl carbonate prepared above were used. This copolymer had a weight average molecular weight of 1200.

Production Example 4

Production of Modified PAA-4 (Copolymer of N,N-dimethyl AA with Acetylated AA (5/5))

A 500 ml four-necked separable flask equipped with a stirrer, a Dimroth reflux device, and a thermometer was charged with 421.29 g of the aqueous solution of free-type copolymer of N,N-dimethylallylamine with allylamine (concentration: 14.35%) produced in Production Example 1. Under ice cooling, ½ mole of allylamine was added dropwise from 44.27 g of acetic anhydride having a purity of 98%, and 34.00 g of a 50% sodium hydroxide solution was neutralized by the number of moles of the by-produced acetic acid. The above procedure was repeated to add the whole quantity, and a reaction was allowed to proceed for 24 hr.

The solution thus obtained was electrodialyzed and desalted to give 522.50 g (100%) of an aqueous solution (concentration: 14.94%) of a free-type copolymer of N,N-dimethylallylamine with acetylated allylamine (comonomer ratio=5:5). This copolymer had a weight average molecular weight of 1200.

A part of the aqueous copolymer solution was brought to a hydrochloride which was reprecipitated from an acetone solvent to give a hydrochloride of the copolymer. The results of the elementary analysis were C=54.12, H=9.26, N=12.47 and were in agreement with calculated values C=54.41, H=9.59, N=12.69. The molar fraction of acetylation was calculated by neutralization titration of the hydrochloride of the copolymer and was found to be 50.12%, that is, was in substantial agreement with the results of the elementary analysis.

Production Example 5

Production of Modified PAA-5 (Copolymer of N,N-dimethyl AA with Monocarbamoylethylated AA (5/5))

A 500 ml four-necked separable flask equipped with a stirrer, a Dimroth reflux device, and a thermometer was charged with 421.29 g of the aqueous solution of free-type copolymer of N,N-dimethylallylamine with allylamine (concentration: 14.35%) produced in Production Example 1, and the mixture was heated to 50° C. 60.42 g of acrylamide (concentration: 50%) was added dropwise thereto, and a reaction was allowed to proceed for 24 hr.

Thus, 465.52 g (97%) of an aqueous solution (concentration: 18.82%) of a free-type copolymer of N,N-dimethylallylamine with carbamoylethylated allylamine (comonomer ratio=5:5) was prepared. This copolymer had a weight average molecular weight of 1200.

A part of the aqueous copolymer solution was brought to a hydrochloride which was reprecipitated from an acetone solvent to give a hydrochloride of the copolymer. The results of the elementary analysis were C=45.84, H=8.69, and N=14.38 and were in agreement with calculated values C=46.16, H=8.80, and N=14.68. The molar fraction of monopropylamidation was calculated by neutralization titration of the hydrochloride of the copolymer and was found to be 48.15%, that is, was in substantial agreement with the results of the elementary analysis.

Production Example 6

Production of Modified PAA-6 (Copolymer of N,N-dimethyl AA with Dicarbamoylethylated AA (5/5))

521.09 g (96%) of an aqueous solution (concentration: 22.30%) of a free-type copolymer of N,N-dimethylallylamine with dicarbamoyletylated allylamine (comonomer ratio=5:5) was prepared in the same manner as in Production Example 5, except that 120.83 g of acrylamide was used. This copolymer had a weight average molecular weight of 1200.

A part of the aqueous copolymer solution was brought to a hydrochloride which was reprecipitated from an acetone solvent to give a hydrochloride of the copolymer. The results of the elementary analysis were C=46.68, H=8.23, and N=15.41 and were in agreement with calculated values C=47.00, H=8.48, and N=15.62. The molar fraction of dipropylamidation was calculated by neutralization titration of the hydrochloride of the copolymer and was found to be 48.06%, that is, was in substantial agreement with the results of the elementary analysis.

Production Example 7

Production of Modified PAA-7 (Copolymer of N,N-dimethyl AA with Monoethoxy-2-hydroxypropylated AA (5/5))

A 500 ml four-necked separable flask equipped with a stirrer, a Dimroth reflux device, and a thermometer was charged with 421.29 g of the aqueous solution of free-type copolymer of N,N-dimethylallylamine with allylamine (concentration: 14.35%) produced in Production Example 1, and the mixture was heated to 50° C. 43.41 g of ethyl glycidyl ether having a purity of 100% was added dropwise thereto, and a reaction was allowed to proceed for 24 hr.

Thus, 463.95 g (100%) of an aqueous solution (concentration: 22.35%) of a free-type copolymer of N,N-dimethylallylamine with monoethoxy-2-hydroxypropylated allylamine (comonomer ratio=5:5) was prepared. This copolymer had a weight average molecular weight of 1200.

A part of the aqueous copolymer solution was brought to a hydrochloride which was reprecipitated from an acetone solvent to give a hydrochloride of the copolymer. The results of the elementary analysis were C=49.44, H=9.41, and N=8.59 and were in agreement with calculated values C=49.21, H=9.53, and N=8.83. The molar fraction of monoethoxy-2-hydroxypropylation was calculated by neutralization titration of the hydrochloride of the copolymer and was found to be 50.230%, that is, was in substantial agreement with the results of the elementary analysis.

Production Example 8

Production of Modified PAA-8 (Copolymer of N,N-dimethyl AA with Diethoxy-2-hydroxypropylated AA (5/5))

504.19 g (990%) of an aqueous solution (concentration: 28.980%) of a free-type copolymer of N,N-dimethylallylamine with diethoxy-2-hydroxypropylated allylamine (comonomer ratio=5:5) was prepared in the same manner as in Production Example 7, except that 86.81 g of ethyl glycidyl ether was used. This copolymer had a weight average molecular weight of 1200.

A part of the aqueous copolymer solution was brought to a hydrochloride which was reprecipitated from an acetone solvent to give a hydrochloride of the copolymer. The results of the elementary analysis were C=61.78, H=11.11, and N=7.89 and were in agreement with calculated values C=61.57, H=11.20, and N=8.01. The molar fraction of monoethoxy-2-hydroxypropylation was calculated by neutralization titration of the hydrochloride of the copolymer and was found to be 49.620%, that is, was in substantial agreement with the results of the elementary analysis.

Production Example 9

Production of Modified PAA-9 (Terpolymer of N,N-dimethyl AA, Carbamoylated AA, and AA (5/3/2))

606.48 g (yield 99%) of an aqueous solution (concentration: 11.65%) of a free-type terpolymer of N,N-dimethylallylamine, carbamoylated allylamine, and allylamine was prepared in the same manner as in Production Example 2, except that 221.02 g of an aqueous sodium cyanate solution and 54.40 g of an aqueous sodium hydroxide solution were used. This copolymer had a weight average molecular weight of 1200.

Production Example 10

Production of Modified PAA-10 (Terpolymer of N,N-dimethyl AA, Methoxycarbonylated AA, and AA (5/3/2))

390.46 g (yield 100%) of an aqueous solution (concentration: 19.25%) of a free-type terpolymer of N,N-dimethylallylamine, methoxycarbonylated allylamine, and allylamine was prepared in the same manner as in Production Example 3a, except that 23.20 g of dimethyl carbonate was used. This copolymer had a weight average molecular weight of 1200.

Production Example 11

Production of Modified PAA-11 (Terpolymer of N,N-dimethyl AA, Acetylated AA, and AA (5/3/2))

523.48 g (100%) of an aqueous solution (concentration: 13.58%) of a free-type terpolymer of N,N-dimethylallylamine, acetylated allylamine, and allylamine was prepared in the same manner as in Production Example 4, except that 26.56 g of acetic anhydride and 20.40 g of an aqueous sodium hydroxide solution were used. This copolymer had a weight average molecular weight of 1200.

Production Example 12

Production of Modified PAA-12 (Terpolymer of N,N-dimethyl AA, Monocarbamoylethylated AA, and AA (5/3/2))

455.93 g (100%) of an aqueous solution (concentration: 17.17%) of a free-type terpolymer of N,N-dimethylallylamine, monocarbamoylethylated allylamine, and allylamine was prepared in the same manner as in Production Example 5; except that 36.25 g of acrylamide was used. This copolymer had a weight average molecular weight of 1200.

Production Example 13

Production of Modified PAA-13 (Terpolymer of N,N-dimethyl AA, Monoethoxy-2-hydroxypropylated AA, and AA (5/3/2))

447.07 g (100%) of an aqueous solution (concentration: 19.34%) of a free-type terpolymer of N,N-dimethylallylamine, monoethoxy-2-hydroxypropylated allylamine, and allylamine was prepared in the same manner as in Production Example 7, except that 26.04 g of ethyl glycidyl ether was used. This copolymer had a weight average molecular weight of 1200.

The weight average molecular weight (Mw) of the modified polyallylamines prepared in the above Production Examples was measured by gel permeation chromatography (GPC method) with a Hitachi L-6000 high-performance liquid chromatograph. Hitachi L-6000 was used as a pump for an eluent passage, a Shodex RO SE-61 differential refractive index detector was used as a detector, and, regarding the column, Asahipak aqueous gel permeation type GS-220 HQ (exclusion limit molecular weight: 3,000) and GS-620 HQ (exclusion limit molecular weight: 2,000,000) were connected to each other. A sample was regulated with an eluent to give a concentration of 0.5 g/100 ml, and 20 µl thereof was used. A 0.4 mol/l aqueous sodium chloride solution was used as the eluent. The chromatography was carried out under conditions of column temperature 30° C. and flow rate 1.0 ml/min. Polyethylene glycols having molecular weights of 106, 194, 440, 600, 1470, 4100, 7100, 10300, 12600, 23000 and the like were used as standard samples to prepare a calibration curve, and Mw of the polymers was determined based on the calibration curve.

Liquid Composition D1a

Liquid composition D1a comprising the following ingredients according to the following formulation was prepared using the polymer fine particles and modified PAA prepared above.

| | |
|---|---|
| Modified PAA-2 (solid basis) | 5.0% |
| Emulsification-type emulsion (solid basis) | 2.0% |
| Glycerin | 25.0% |
| Triethylene glycol monobutyl ether | 3.0% |
| Olfine E1010 | 0.3% |
| Water | Balance |

Liquid Composition D1b

Liquid composition D1b was prepared in the same manner as in liquid composition D1a, except that the sol-type emulsion (alkali-soluble emulsion) was used instead of the emulsification-type emulsion.

Liquid Composition D1c

Liquid composition D1c was prepared in the same manner as in liquid composition D1a, except that the sol-type emulsion (sulfone group-containing emulsion) was used instead of the emulsification-type emulsion.

Liquid Composition D1d

Liquid composition D1d was prepared in the same manner as in liquid composition D1a, except that AQUACER 593 (manufactured by Bik-Chemie Japan K.K.), a modified polypropylene emulsion, was used instead of the emulsification-type emulsion.

Liquid Compositions D2a to D12

Liquid compositions D2a to 12 were prepared in the same manner as in liquid composition D1c, except that modified PAA-3a to 13 was used instead of modified PAA-2.

Liquid Composition D13

| | |
|---|---|
| Modified PAA-2 | 2.4% (solid basis) |
| AQUACER 593 | 1.5% (solid basis) |
| (manufactured by Bik-Chemie Japan K.K.) | |
| Glycerin | 28.0% |
| Triethylene glycol monobutyl ether | 3.0% |
| Olfine E1010 | 0.3% |
| Water | Balance |

Liquid Composition D14

| | |
|---|---|
| Modified PAA-2 | 2.4% (solid basis) |
| AQUACER 513 | 1.5% (solid basis) |
| (manufactured by Bik-Chemie Japan K.K.) | |
| Glycerin | 28.0% |
| Triethylene glycol monobutyl ether | 3.0% |
| Olfine E1010 | 0.3% |
| Water | Balance |

Liquid Composition D15

A liquid composition having the following formulation was prepared in the same manner as in liquid composition D1a.

| | |
|---|---|
| Unmodified PAA | 5.0% (solid basis) |
| (PAA-01 manufactured by Nitto Boseki Co., Ltd.) | |
| Glycerin | 25.0% |
| Triethylene glycol monobutyl ether | 3.0% |
| Olfine E1010 | 0.3% |
| Water | Balance |

Liquid Composition D16

Liquid composition D16 was prepared in the same manner as in liquid composition D15, except that modified PAA-1 was used instead of unmodified PAA.

Liquid Composition D17

Liquid composition D17 was prepared in the same manner as in liquid composition D15, except that dimethyl modified PAA (number of monomers of dimethyl AA: number of monomers of AA=95:5 to 100:0; and free from other modified AA monomer) was used instead of unmodified PAA.

Liquid Composition D18

Liquid composition D18 was prepared in the same manner as in liquid composition D15, except that unmodified PAA was not added.

Liquid Composition D19

A liquid composition having the following formulation was prepared in the same manner as in liquid composition D1a.

| | |
|---|---|
| Modified PAA-1 | 2.4% (solid basis) |
| Glycerin | 28.0% |
| Triethylene glycol monobutyl ether | 3.0% |
| Olfine E1010 | 0.3% |
| Water | Balance |

The surface tension of the liquid compositions thus prepared was measured with CBVP-Z, manufactured by Kyowa Interface Science Co., LTD. As a result, it was found that, for all of liquid compositions D1a to D19 of the Examples, the surface tension was 25 to 35 dyn/cm.

The formulations of liquid compositions D1a to D19 are shown in Table 7.

TABLE 7

| | Modified PAA | | Composition ratio of modified PAA monomers | | | |
|---|---|---|---|---|---|---|
| | Production Example | Content, % | Unmodified AA | Dimethyl modified AA | Other modification component | Polymer fine particles |
| Liquid composition D1a | Modified PAA-2 | 5.0 | 0 | 5 | 5 (Urea modification) | Emulsification-type EM |
| Liquid composition D1b | Modified PAA-2 | 5.0 | 0 | 5 | 5 (Urea modification) | Alkali soluble EM |
| Liquid composition D1c | Modified PAA-2 | 5.0 | 0 | 5 | 5 (Urea modification) | Sulfonic acid group-containing EM |
| Liquid composition D1d | Modified PAA-2 | 5.0 | 0 | 5 | 5 (Urea modification) | AQUACER 593 |
| Liquid composition D2a | Modified PAA-3a | 5.0 | 0 | 5 | 5 (Urethane modification) | Sulfonic acid group-containing EM |
| Liquid composition D2b | Modified PAA-3b | 5.0 | 0 | 3 | 7 (Urethane modification) | Sulfonic acid group-containing EM |
| Liquid composition D2c | Modified PAA-3c | 5.0 | 0 | 7 | 3 (Urethane modification) | Sulfonic acid group-containing EM |

TABLE 7-continued

|  | Modified PAA | | Composition ratio of modified PAA monomers | | | |
| --- | --- | --- | --- | --- | --- | --- |
|  | Production Example | Content, % | Unmodified AA | Dimethyl modified AA | Other modification component | Polymer fine particles |
| Liquid composition D3 | Modified PAA-4 | 5.0 | 0 | 5 | 5 (Acyl modification) | Sulfonic acid group-containing EM |
| Liquid composition D4 | Modified PAA-5 | 5.0 | 0 | 5 | 5 (Michael addition modified monosubsitition) | Sulfonic acid group-containing EM |
| Liquid composition D5 | Modified PAA-6 | 5.0 | 0 | 5 | 5 (Michael addition modified disubsitition) | Sulfonic acid group-containing EM |
| Liquid composition D6 | Modified PAA-7 | 5.0 | 0 | 5 | 5 (Alcohol modified monosubsitition) | Sulfonic acid group-containing EM |
| Liquid composition D7 | Modified PAA-8 | 5.0 | 0 | 5 | 5 (Alcohol modified disubsitition) | Sulfonic acid group-containing EM |
| Liquid composition D8 | Modified PAA-9 | 5.0 | 2 | 5 | 3 (Urea modification) | Sulfonic acid group-containing EM |
| Liquid composition D9 | Modified PAA-10 | 5.0 | 2 | 5 | 3 (Urethane modification) | Sulfonic acid group-containing EM |
| Liquid composition D10 | Modified PAA-11 | 5.0 | 2 | 5 | 3 (Acyl modification) | Sulfonic acid group-containing EM |
| Liquid composition D11 | Modified PAA-12 | 5.0 | 2 | 5 | 3 (Michael addition modified monosubsitition) | Sulfonic acid group-containing EM |
| Liquid composition D12 | Modified PAA-13 | 5.0 | 2 | 5 | 3 (Alcohol modified monosubstitution) | Sulfonic acid group-containing EM |
| Liquid composition D13 | Modified PAA-2 | 2.4 | 0 | 5 | 5 (Urea modification) | AQUACER 593 |
| Liquid composition D14 | Modified PAA-2 | 2.4 | 0 | 5 | 5 (Urea modification) | AQUACER 513 |
| Liquid composition D15 | Unmodified PAA-1 | 5.0 | 10 | 0 | 0 | — |
| Liquid composition D16 | Modified PAA-1 | 5.0 | 5 | 5 | 0 | — |
| Liquid composition D17 | Dimethyl modified PAA | 5.0 | 0-0.5 | 9.5-10 | 0 | — |
| Liquid composition D18 | — | 0 | 0 | 0 | 0 | — |
| Liquid composition D19 | Modified PAA-1 | 2.4 | 5 | 5 | 0 | — |

In the table, EM represents emulsion.

Liquid composition E1 comprising the following ingredients according to the following formulation was prepared using modified PAA prepared above.

Liquid Composition E1

| | |
| --- | --- |
| Modified PAA-2 | 5.0% (solid basis) |
| Glycerin | 25.0% |
| Triethylene glycol monobutyl ether | 3.0% |
| Olfine E1010 | 0.3% |
| Water | Balance |

Liquid Composition E2a to E12

Liquid composition E2a to 12 were prepared in the same manner as in liquid composition E1, except that modified PAA-3a to 13 were used instead of modified PAA-2.

The surface tension of the liquid compositions thus prepared was measured with CBVP-Z, manufactured by Kyowa Interface Science Co., LTD. As a result, it was found that, for all of liquid compositions E1 to E12 of the Examples, the surface tension was 25 to 35 dyn/cm.

The formulations of liquid compositions E1 to E12 are shown in Table 8.

TABLE 8

|  | Modified PAA | | Composition ratio of modified PAA monomers | | | Polymer fine particles |
| --- | --- | --- | --- | --- | --- | --- |
|  | Production Example | Content, % | Unmodified AA | Dimethyl modified AA | Other modification components | |
| Liquid composition E1 | Modified PAA-2 | 5.0 | 0 | 5 | 5 (Urea modification) | — |
| Liquid composition E2a | Modified PAA-3a | 5.0 | 0 | 5 | 5 (Urethane modification) | — |
| Liquid composition E2b | Modified PAA-3b | 5.0 | 0 | 3 | 7 (Urethane modification) | — |
| Liquid composition E2c | Modified PAA-3c | 5.0 | 0 | 7 | 3 (Urethane modification) | — |
| Liquid composition E3 | Modified PAA-4 | 5.0 | 0 | 5 | 5 (Acyl modification) | — |
| Liquid composition E4 | Modified PAA-5 | 5.0 | 0 | 5 | 5 (Michael addition modified monosubstitution) | — |
| Liquid composition E5 | Modified PAA-6 | 5.0 | 0 | 5 | 5 (Michael addition modified disubstitution) | — |
| Liquid composition E6 | Modified PAA-7 | 5.0 | 0 | 5 | 5 (Alcohol modified monosubstitution) | — |
| Liquid composition E7 | Modified PAA-8 | 5.0 | 0 | 5 | 5 (Alcohol modified disubstitution) | — |
| Liquid composition E8 | Modified PAA-9 | 5.0 | 2 | 5 | 3 (Urea modification) | — |
| Liquid composition E9 | Modified PAA-10 | 5.0 | 2 | 5 | 3 (Urethane modification) | — |
| Liquid composition E10 | Modified PAA-11 | 5.0 | 2 | 5 | 3 (Acyl modification) | — |
| Liquid composition E11 | Modified PAA-12 | 5.0 | 2 | 5 | 3 (Michael addition modified monosubstitution) | — |
| Liquid composition E12 | Modified PAA-13 | 5.0 | 2 | 5 | 3 (Alcohol modified monosubstitution) | — |
| Liquid composition D16 | Modified PAA-1 | 5.0 | 5 | 5 | 0 | — |
| Liquid composition D17 | Dimethyl modified PAA | 5.0 | 0-0.5 | 9.5-10 | 0 | — |
| Liquid composition D18 | — | 0 | 0 | 0 | 0 | — |

Preparation of Ink Compositions

Ink compositions having formulations shown in Table 9 were prepared according to the following procedure. A pigment and a resin (styrene-acrylic acid copolymer) were first mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed, other additions were added, and the mixture was stirred at room temperature for 20 min and was filtered through a 10-μm membrane filter to prepare a pigment-based ink.

TABLE 9

|  | Ink composition | | | |
| --- | --- | --- | --- | --- |
|  | Yellow | Magenta | Cyan | Black |
| C.I. Pigment Yellow 74 | 3.0 | — | — | — |
| C.I. Pigment Red 202 | — | 3.0 | — | — |
| C.I. Pigment Blue 15:3 | — | — | 3.0 | — |
| Carbon black | — | — | — | 3.0 |
| Styrene-acrylic acid copolymer | 1.0 | 1.0 | 1.0 | 1.0 |
| Olfine E1010 | 0.5 | 0.5 | 0.5 | 0.5 |
| Glycerin | 15.0 | 15.0 | 15.0 | 15.0 |
| TEGmBE | 5.0 | 5.0 | 5.0 | 5.0 |
| Triethanolamine | 0.9 | 0.9 | 0.9 | 0.9 |
| Water | Balance | Balance | Balance | Balance |
| Total | 100.0 | 100.0 | 100.0 | 100.0 |

In the table,
TEGmBE: triethylene glycol monobutyl ether, and
Olfine E1010: acetylene glycol surfactant (manufactured by Nissin Chemical Industry Co., Ltd.).

4. Evaluation Test (1) Gloss

Each of liquid compositions D1a to D19 and E1 to E12 and an ink composition were loaded into an ink jet printer (MC-2000, manufactured by Seiko Epson Corporation), and printing was carried out on ink jet specialty paper (PM Photo Paper, manufactured by Seiko Epson Corporation) at 720×720 dpi and duty 40%.

The term "duty" is a value calculated by the following equation.

Duty(%)=Number of actually printed dots/(longitudinal resolution×lateral resolution)×100 wherein "number of actually printed dots" is the number of actually printed dots per unit area, and "longitudinal resolution" and "lateral resolution" each are resolution per unit area. 100% duty refers to the maximum weight of ink of a single color based on the pixel.

For the recorded matters, the gloss was evaluated in the same manner as in 1-1 Evaluation of gloss by measurement in the Examples of invention according to the first aspect.

The results of evaluation were as shown in Table 10. In the Examples, the printing of the liquid composition resulted in improved gloss of the nonprinted part.

(2) Color Development Test

Each of liquid compositions D1a to D19 and E1 to E12 and an ink composition were loaded into an ink jet printer (MC-2000, manufactured by Seiko Epson Corporation), and printing was carried out on plain paper (Xerox 4024) at 720×720 dpi. Evaluation was carried out in the same manner as in Color development test in the above 2.(1). The results were as shown in Table 10 below.

(3) Suitability for Treatment of Waste Liquid in Cap Free from Nonwoven Fabric

Each of liquid compositions D1a to D19 and E1 to E12 and an ink composition were loaded into an ink jet printer (MC-2000, manufactured by Seiko Epson Corporation), and evaluation was carried out in the same manner as in evaluation 3 in the above 1.

The results of evaluation were as shown in Table 10. In the Examples, the suitability for waste liquid treatment was excellent, indicating that cleaning could be carried out with good results.

(4) Suitability for Treatment of Waste Liquid in Cap Provided with Nonwoven Fabric Evaluation was carried out in the same manner as in evaluation 4 in the above 1. The results of evaluation were as shown in Table 10. In the Examples, the suitability for waste liquid treatment was excellent, indicating that cleaning could be carried out with good results.

(5) Printing Stability

Each of liquid compositions D1a to D19 and E1 to E12 and an ink composition were loaded into an ink jet printer (MC-2000, manufactured by Seiko Epson Corporation), and printing was then continuously carried out on 200 sheets of PM photographic paper of size A4 in an environment of 40° C. under conditions of 720×720 dpi and Duty 100%. Thereafter, a nozzle check pattern was printed without conducting cleaning. When the quality of the prints was A as evaluated based on the following evaluation criteria, the nozzle check pattern was further continuously printed on 400 sheets of the paper (600 sheets in total). Thereafter, the nozzle check pattern was printed without cleaning. The prints were evaluated according to the following criteria.

AA: Both the check pattern after continuous printing of 200 sheets and the check pattern after continuous printing of 600 sheets could be normally printed.

A: The check pattern after continuous printing of 600 sheets in total could not be normally printed, although the check pattern after continuous printing of 200 sheets could be normally printed.

B: The check pattern after continuous printing of 200 sheets could not be normally printed.

The results of evaluation were as shown in Table 10.

TABLE 10

| | | Evaluation | | | | |
| --- | --- | --- | --- | --- | --- | --- |
| | Liquid composition | Gloss | Color development | Suitability for waste liquid treatment (free from nonwoven fabric) | Suitability for waste liquid treatment (provided with nonwoven fabric) | Printing stability |
| Ex. D1a | Liquid composition D1a | AA | AA | S | AA | AA |
| Ex. D1b | Liquid composition D1b | AA | AA | S | AA | AA |
| Ex. D1c | Liquid composition D1c | AA | AA | S | AA | AA |
| Ex. D1d | Liquid composition D1d | AA | AA | S | AA | AA |
| Ex. D2a | Liquid composition D2a | AA | AA | S | AA | AA |

TABLE 10-continued

| | Liquid composition | Gloss | Color development | Suitability for waste liquid treatment (free from nonwoven fabric) | Suitability for waste liquid treatment (provided with nonwoven fabric) | Printing stability |
|---|---|---|---|---|---|---|
| Ex. D2b | Liquid composition D2b | AA | AA | S | AA | AA |
| Ex. D2c | Liquid composition D2c | AA | AA | S | AA | A |
| Ex. D3 | Liquid composition D3 | AA | AA | S | AA | AA |
| Ex. D4 | Liquid composition D4 | AA | AA | AA | A | AA |
| Ex. D5 | Liquid composition D5 | AA | AA | S | AA | AA |
| Ex. D6 | Liquid composition D6 | AA | AA | AA | A | AA |
| Ex. D7 | Liquid composition D7 | AA | AA | S | AA | AA |
| Ex. D8 | Liquid composition D8 | AA | AA | AA | A | AA |
| Ex. D9 | Liquid composition D9 | AA | AA | AA | A | AA |
| Ex. D10 | Liquid composition D10 | AA | AA | AA | A | AA |
| Ex. D11 | Liquid composition D11 | AA | AA | AA | A | AA |
| Ex. D12 | Liquid composition D12 | AA | AA | AA | A | AA |
| Ex. D13 | Liquid composition D13 | AA | A | S | AA | AA |
| Ex. D14 | Liquid composition D14 | AA | A | S | AA | AA |
| Comp. Ex. D1 | Liquid composition D15 | C | AA | A | B | A |
| Comp. Ex. D2 | Liquid composition D16 | C | AA | A | A | A |
| Comp. Ex. D3 | Liquid composition D17 | C | AA | AA | A | B |
| Comp. Ex. D4 | Liquid composition D18 | E | B | A | A | A |
| Comp. Ex. D5 | Liquid composition D19 | C | A | A | A | A |
| Ex. E1 | Liquid composition E1 | C | AA | S | AA | AA |
| Ex. E2a | Liquid composition E2a | C | AA | S | AA | AA |
| Ex. E2b | Liquid composition E2b | C | AA | S | AA | AA |
| Ex. E2c | Liquid composition E2c | C | AA | S | AA | AA |
| Ex. E3 | Liquid composition E3 | C | AA | S | AA | AA |
| Ex. E4 | Liquid composition E4 | C | AA | S | AA | AA |
| Ex. E5 | Liquid composition E5 | C | AA | S | AA | AA |
| Ex. E6 | Liquid composition E6 | C | AA | AA | A | AA |
| Ex. E7 | Liquid composition E7 | C | AA | S | AA | AA |
| Ex. E8 | Liquid composition E8 | C | AA | AA | A | AA |
| Ex. E9 | Liquid composition E9 | C | AA | S | AA | AA |
| Ex. E10 | Liquid composition E10 | C | AA | AA | A | AA |
| Ex. E11 | Liquid composition E11 | C | AA | AA | A | AA |
| Ex. E12 | Liquid composition E12 | C | AA | AA | A | AA |
| Comp. Ex. D1 | Liquid composition D15 | C | AA | A | B | A |
| Comp. Ex. D2 | Liquid composition D16 | C | AA | A | A | A |
| Comp. Ex. D3 | Liquid composition D17 | C | AA | AA | A | B |
| Comp. Ex. D4 | Liquid composition D18 | E | B | A | A | A |

The invention claimed is:

1. A liquid composition for use with an ink composition for deposition on a recording medium, the composition being free from any colorant and comprising a modified polyallylamine, a water soluble organic solvent, polymer fine particles selected from the group consisting of anionic polymer particles, nonionic polymer particles and a combination of anionic and nonionic polymer, and water, wherein said modified polyallylamine comprises recurring units (a) and (c) or recurring units (a), (b) and (c):

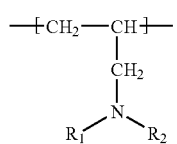
(a)

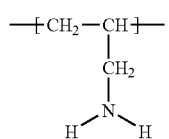
(b)

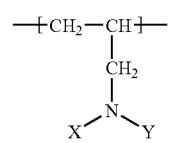
(c)

wherein $R^1$ and $R^2$ each independently represent an alkyl group having 1 to 4 carbon atoms, X represents any of groups (i) to (v):

(i) —$CONH_2$,
(ii) —$COOR_3$ wherein $R_3$ represents an alkyl group having 1 to 12 carbon atoms, or an aryl group,
(iii) —$COR_4$ wherein $R_4$ represents an alkyl group having 1 to 12 carbon atoms,
(iv) —$CH_2CH(R_5)$-A wherein $R_5$ represents a hydrogen atom or a methyl group and A is selected from the group consisting of —$CONR_6R_7$ wherein $R_6$ and $R_7$ each independently represent a hydrogen atom or an alkyl group having 1 to 8 carbon atoms and the alkyl group is optionally substituted by a group selected from the group consisting of a hydroxyl group, a keto group, a monoalkylamino group having t to 4 carbon atoms, a dialkylamino group where the alkyl contains 1 to 4 carbon atoms or a trialkyl ammonium group where the alkyl contains 1 to 4 carbon atoms, or $NR_6R_7$ combine together to represent a cyclic amino group of a piperidino or morpholino group, —CN and COOR$_8$ wherein R$_8$ represents an alkyl group having 1 to 8 carbon atoms and the alkyl group is optionally substituted by a group selected from the group consisting of a hydroxyl group, a keto group, a monoalkylamino group having 1 to 4 carbon atoms, a, a dialkylamino group where the alkyl contains 1 to 4 carbon atoms and, a trialkyl ammonium group where the alkyl contains 1 to 4 carbon atoms or (v) —CH$_2$CH(OH)-B wherein B represents an alkyl group having 1 to 8 carbon atoms and the alkyl group is optionally substituted by a group selected from the group consisting of a hydroxyl group, an alkoxy group having 1 to 4 carbon atoms, and an alkenyloxy group; Y has the same meaning as X, or a hydrogen atom, and X and Y each may be the same or different each recurring unit.

2. The liquid composition according to claim 1, wherein said modified polyallylamine comprises 5 to 95% of recurring unit (a) and the content of recurring unit (c) based on the total number of recurring units (b) and (c) is 60 to 100%.

3. The liquid composition according to claim 2, wherein the modified polyallylamine has a weight average molecular weight of not more than 5,000.

4. The liquid composition according to claim 1, wherein the modified polyallylamine has a weight average molecular weight of not more than 5,000.

5. The liquid composition according to claim 1, wherein said polymer fine particles have a glass transition temperature of 50° C. or below.

6. The liquid composition according to claim 1, which comprises an emulsion prepared by dispersing said polymer fine particles in an aqueous medium.

7. The liquid composition according to claim 6, wherein said emulsion prepared by dispersing said nonionic polymer fine particles in an aqueous medium is selected from the group consisting of nonionic polyethylene emulsions or modification products thereof, nonionic polypropylene emulsions or modification products thereof, and mixtures thereof.

8. The liquid composition according to claim 6, wherein said emulsion prepared by dispersing said anionic polymer fine particles in an aqueous medium is selected from the group consisting of emulsification-type emulsions, sol-type emulsions, anionic polyethylene emulsions or modification products thereof, anionic polypropylene emulsions or modification products thereof, and mixtures thereof.

9. The liquid composition according to claim 8, wherein said sol-type emulsion is an alkali soluble emulsion and/or a sulfone group-containing emulsion.

10. The liquid composition according to claim 9, wherein said alkali soluble emulsion has been prepared by dispersing a polymer in an aqueous medium, said polymer having been prepared by polymerizing an ethylenically unsaturated carboxylic acid monomer and a monomer copolymerizable with said ethylenically unsaturated carboxylic acid monomer in the presence of an alcoholic hydroxyl group-containing water soluble polymeric compound or a copolymerizable surfactant.

11. The liquid composition according to claim 9, wherein said sulfone group-containing emulsion is a diene sulfonic acid group-containing emulsion and/or a nondiene sulfonic acid group-containing emulsion.

12. The liquid composition according to claim 1, wherein the organic solvent is one compound or a combination of two or more compounds selected from the group consisting of glycol ether compounds, alkyldiol compounds, and polyhydric alcohol compounds.

13. An ink set comprising:
the liquid composition according to claim 1; and
an ink composition comprising at least a colorant, a water soluble organic solvent and water.

14. An ink jet recording method comprising the steps of providing the ink set according to claim 13, and depositing the liquid composition and the ink composition onto a recording medium to perform recording.

15. An ink jet recording method comprising the steps of:
depositing the liquid composition according to claim 1 and an ink composition onto a recording medium to perform recording; and
then heat treating the recording medium at a temperature at or above the glass transition temperature of the polymer fine particles.

* * * * *